US008145556B2

(12) United States Patent
Tealdi et al.

(10) Patent No.: US 8,145,556 B2
(45) Date of Patent: Mar. 27, 2012

(54) ONLINE MORTGAGE APPROVAL AND SETTLEMENT SYSTEM AND METHOD THEREFOR

(76) Inventors: Daniel A. Tealdi, San Bruno, CA (US); Matthew S. DeArmey, Pacifica, CA (US); Dickson Leung, San Francisco, CA (US)

( * ) Notice: Subject to any disclaimer, the term of this patent is extended or adjusted under 35 U.S.C. 154(b) by 1762 days.

(21) Appl. No.: 09/802,360

(22) Filed: Mar. 9, 2001

(65) Prior Publication Data

US 2001/0029482 A1 Oct. 11, 2001

Related U.S. Application Data

(60) Provisional application No. 60/195,762, filed on Apr. 10, 2000, provisional application No. 60/209,344, filed on Jun. 5, 2000.

(51) Int. Cl.
*G06Q 40/00* (2006.01)
(52) U.S. Cl. .............. 705/37; 705/36 R; 705/38; 705/41
(58) Field of Classification Search .................... 705/37, 705/36 R, 38, 41
See application file for complete search history.

(56) References Cited

U.S. PATENT DOCUMENTS

| | | | | |
|---|---|---|---|---|
| 5,283,856 | A | | 2/1994 | Gross et al. ...................... 395/51 |
| 5,481,647 | A | * | 1/1996 | Brody et al. ..................... 706/11 |
| 5,615,268 | A | | 3/1997 | Bisbee et al. .................... 380/25 |
| 5,651,268 | A | | 7/1997 | Aikawa et al. .................. 62/525 |
| 5,748,738 | A | | 5/1998 | Bisbee et al. .................... 380/25 |
| 5,870,721 | A | | 2/1999 | Norris ............................. 705/38 |
| 5,995,947 | A | * | 11/1999 | Fraser et al. .................... 705/38 |
| 6,021,202 | A | | 2/2000 | Anderson et al. ............... 380/25 |
| 6,223,566 | B1 | * | 5/2001 | Jamison ........................... 70/11 |
| 6,438,526 | B1 | * | 8/2002 | Dykes et al. ................... 705/38 |

OTHER PUBLICATIONS

Real Estate Technology, "Caution: Net-Savvy Consumers Ahead", Michael J. Russer.
Contact, "Mortgage Lenders Increase Reliance on Automation", Jeff Lebowitz (Fourth Quarter 1998).
Mortgage Banking, "Building New Channels of Distribution", Jeff Lebowitz (Jan. 1999).
Equity Magazine, the Journal of the National Home Equity Mortgage Association, "How Technology Continues to Change the Mortgage Banking Industry", Joseph J. Murin (Dec. 1996).
Morgan Stanley Dean Witter, "Toward the Paperless Mortgage" (Feb. 2000).
Mortgage Banking, "The New Mortgage Banking Business", Paul Tuttle (May 1998).
"Lendware™ Overview", Framework, Inc. (1999).

(Continued)

*Primary Examiner* — Daniel Felten
(74) *Attorney, Agent, or Firm* — Blakely, Sokoloff, Taylor & Zafman LLP

(57) ABSTRACT

A method for automatically fulfilling lending conditions includes the steps of maintaining a database of a plurality of registered service providers, receiving a loan application having one or more conditions to be fulfilled for the loan application to be approved, evaluating the one or more conditions to determine one or more actions to be taken towards fulfilling the one or more conditions, and automatically executing at least one action of the one or more actions to be taken towards fulfilling at least one of the one or more conditions, wherein the at least one action includes automatically requesting information for fulfilling the at least one condition from a registered service provider of the plurality of registered service providers.

14 Claims, 18 Drawing Sheets

OTHER PUBLICATIONS

Ocwen Technology Xchange, "REALTrans$^{SM}$ Web-Based Application" information printed from http://www.otx.net/whoarewe; http://www.otx.net/webtop; http://www.otx.net/dts (Ocwen Technology Xchange World Wide Website) on Apr. 5, 2000.

* cited by examiner

| 701 | 702 | 703 | 704 | 705 | 706 | 707 | 708 |
|---|---|---|---|---|---|---|---|
| Lender Name | Address | Contact Info. | ID | Password | Lender rating | Access level | Warehouse bank info. |
| ABC Lending Co. | 123 Main St. Anytown, State 12345 | (555)123-4567 (tel.) (555)123-7654 (fax) jdoe@abclend.com (e-mail) | abclend | Dnelcba | 8 | J. Doe - write & edit A. Smith - read F. Doe - write | Treetop Bank 456 Main St. Anytown, State (555)321-1234 (tel.) 65789-908765 (routing number) |

| 709 | 710 | 711 | 712 | 713 | 714 | 715 | 716 | 717 | 718 |
|---|---|---|---|---|---|---|---|---|---|
| Preferred Employment Service provider | Preferred Title Company | Preferred Appraiser | Preferred secondary market investors | Underwriting rules and guidelines | Quality control guidelines | Commitment contracts | Preferred data exchange format | Server address | Server certificate authority |
| LB Employment Service Provider 789 Main St. Anytown, State (555)345-6789 (tel.) (555)345-7890 (fax) 7865902 (server address) Registered | USA Title Co. 321 Main Street Anytown, State (555)135-7997 (tel) (555)135-9797 (Fax) 1246789 (server address) Registered | None | 1. ABC Bank 654 Main St. Anytown, State (555)125-7997 (tel) (555)125-9797 (fax) 2416789 (server address) Registered  2. DRE Bank 564 Main St. Anytown, State (555)525-7997 (tel) (555)525-9797 (fax) 2416879 (server address) Not-Registered | 1. Check prior employer if applicant employed less than 1 year with current employer 2. check bank records for one year prior to current date. | None | 1. ABC Bank - $10,000,000 50 - 30-year fixed  2. XYZ Bank $5,000,000 25 - 15 year ARM | XML | 549087 | DST | fig. 7

| 801 | 802 | 803 | 804 | 805 | 806 | 807 | 808 | 809 | 810 | 811 | 812 |
|---|---|---|---|---|---|---|---|---|---|---|---|
| Service | Service Provider Name | Address | Contact Info. | Reg.? | ID | Password | Rating | Access Level | Preferred data inter. format | Server address | Server cert. Auth. |
| Employment | LB Employment Service Provider | 789 Main St. Anytown, State | (555)345-6789 (tel.) (555)345-7890 (fax) jsmith@lbemploy.com | Yes | 54768 | Lbemploy | 9 | B. Doe - read & write C. Smith - read | XML | 0987 | DST |
|  | FG Employment Service Provider | 765 Main St. Anytown, State | (555)453-6789 (tel.) (555)453-7890 (fax) llee@fgemploy.com | No |  |  |  |  |  |  |  |
| Bank | ABC Bank | 981 Main St. Anytown, State | (555)987-6789 (tel.) (555)987-7890 (fax) clee@abcbank.com | Yes | 08654 | Abcbank | 3 | C. Lee, G. Thomas, F. Smith - read & write | XML | 7685 | DST |
|  | DEF Bank | 801 Main St. Anytown, State | (555)467-6789 (tel.) (555)467-7890 (fax) jdoe@defbank.com | Yes | 97508 | Defbank | 8 | J. Doe, L. Lee, R. Jones - read & write | XML | 7601 | DST |

| Loan ID 901 | Loan status 902 | Borrower Name 903 | Borrower ID 904 | Credit rating 905 | Claimed funds 906 | Claimed deposits 907 | Claimed employer 908 | Claimed title 909 | Claimed employ. Income 910 | Claimed expenses 911 | Claimed debt 912 |
|---|---|---|---|---|---|---|---|---|---|---|---|
| 135426 | Pending | Jon Doe | 555-12-1212 | Good | $45,000 | $10,000 | ABC Corp. | Engineer | $50,000/ year | $1500/ month | $23,000.00 |

| Claimed other income 913 | Actual funds 914 | Actual deposits 915 | Confirmed employer 916 | Confirmed title 917 | Confirmed income 918 | Confirmed expenses 919 | Confirmed debt 920 | Current address 921 | Property address 922 | Confirmed property type 923 |
|---|---|---|---|---|---|---|---|---|---|---|
| None | $43,698.37 | $10,561.23 | ABC Corp. | Engineer | $50,000/ year | $1500/ month | $23,000 | 1 Main St. Anytown, State | 112 Jane St. Anytown, State | Condo |

| Property appraised value 924 | Current title of property 925 | Post-purchase property title 926 | Loan amount applied for 927 | Initial deposits 928 | Origin of deposits 929 | Approved interest rates 930 |
|---|---|---|---|---|---|---|
| $125,000 | | | $98,000 | $5,000 | Bank account | 7.125 |

| Points 931 | Loan term 932 | Pre-approval case number 933 | Secondary market investor 934 | Product Number 935 |
|---|---|---|---|---|
| 1 | 30 year fixed | 543 | XYZ Bank | YXC321 |

FIG. 9

| CODE | CONDITION | ACTION |
|---|---|---|
| ABC123 | VERIFY EMPLOYMENT INFO | 1. DETERMINE WHETHER APPLICANT IS EMPLOYEE OF CO. OR SELF<br>2. IF SELF-EMPLOYED REQUEST EMPLOYMENT INFO FROM APPLICANT<br>3. IF COMPANY EMPLOYEE REQUEST EMPLOYMENT INFO. FROM PREFERRED EMPLOYMENT SERVICE PROVIDER<br>3A. CHECK LENDER DATABASE 640 FOR PROVIDER<br>3B. IF NONE USE DEFAULT SERVICE PROVIDER |
| 456DEF | VERIFY BANK ACCT. INFO | 1. DETERMINE WHETHER APPLICANT'S BANK IS ENROLLED.<br>2. IF ENROLLED, SEND REQUEST TO BANK FOR ACCT. VERIFICATION<br>3. IF NOT ENROLLED, NOTIFY PROCESSOR TO OBTAIN BANK ACCT. VERIFICATION |
| 13579 | VERIFY INCOME TAX | 1. DETERMINE WHETHER IRS IS ENROLLED<br>2. IF ENROLLED, SEND REQUEST TO IRS FOR INCOME TAX VERIFICATION<br>3. IF NOT ENROLLED, NOTIFY PROCESSOR TO OBTAIN INCOME TAX VERIFICATION |
| 2468 | OBTAIN APPRAISAL | 1. DETERMINE WHETHER LENDER SELECTED PREFERRED APPRAISER IN LENDER DATABASE 640.<br>2. IF PREFERRED APPRAISER SELECTED REQUEST APPRAISAL FROM PREFERRED APPRAISER<br>3. IF NOT SELECTED, REQUEST APPRAISAL FROM DEFAULT APPRAISER |
| YPRTLS | OBTAIN PRELIMINARY TITLE | 1. PREFERRED TITLE CO. SELECTED IN LENDER DATABASE 640?<br>2. YES, REQUEST PRELIMINARY TITLE FROM PREFERRED TITLE CO.<br>2. NO, REQUEST PRELIMINARY TITLE FROM DEFAULT TITLE CO. |

FIG. 15

ONLINE MORTGAGE APPROVAL AND SETTLEMENT SYSTEM AND METHOD THEREFOR

RELATED APPLICATIONS

This application claims priority under 35 U.S.C. 119(e) from U.S. provisional applications No. 60/195,762 filed Apr. 10, 2000 and 60/209,344 filed Jun. 5, 2000.

FIELD OF THE INVENTION

The subject invention is related to utilizing secure on-line communication systems for handling loans in the mortgage industry.

BACKGROUND OF THE INVENTION

State of Residential Mortgage Markets

Traditionally, when an individual buys or refinances a home, a lender has to obtain certain confidential information, such as income, employment, and credit history about that individual. The lender or the broker also obtains reports on the property such as title reports and an appraisal. The amount of manual labor required to process a loan has culminated into a typical 30-day lag from application to actual funding.

Even with the growth in online mortgage brokers, much of the mortgage industry remains paper-intensive. Although computers may generate some of the documents, the computers serve as glorified typewriters. Loans will only be considered complete and money will change hands when all the paper work has been completed.

Causes of Inefficiencies

The reason for this paper-intensive process is due to the secondary market in the residential mortgage industry. The residential mortgage industry is comprised of two major institutions: the primary market and the secondary market. The primary market, typically banks or financial institutions, lends money to consumers. The secondary market, such as Freddie Mac, purchases mortgages in large volume from the primary lenders. The secondary market investors then issue mortgage-backed securities for sale to the general public. This process provides liquidity for the lenders to make more loans to consumers.

For these mortgage-backed securities to be competitive, the secondary market investors guarantee the principal against default. Because of the guarantee, the secondary market investors are highly risk-sensitive.[1] This translates into the need to verify information about the borrower (it will be appreciated by one of ordinary skill in the art that the terms borrower and applicant are used interchangeably). Since the primary lender will not make a loan unless it knows the loan is marketable to the secondary market, it accepts the verification guidelines from the secondary market investors. These guidelines mandate that the lender, and thus, the mortgage broker, obtain a myriad of personal information and property specific information. Traditionally, this information is collected manually.

[1]. For example, 73% or $533 billion of loans in the Freddie Mac's portfolio is at risk, i.e., Freddie Mac has taken primary default risk. The total reserves for loan losses was $768 million for Freddie Mac alone.

Industry Statistics

The latest statistics show that the residential loan market funded approximately $1 trillion annually in the last 5 years.[2] The costs of manually processing each loan ranges from $1,500 to $3,000.[3] Because of the manual labor, the costs per loan remain the same regardless of the number of loans processed and the loan amount. If the average loan were $150,000, there would have been approximately 6.7 million loans originated annually, and consequently approximately $10 to 20 billion spent on processing loans manually.

[2] Mortgage Industry Directory, published by Faulkner and Gray. The actual amount fluctuates by a few hundred billion dollars, depending on various factors such as interest rates.
[3] The Internet Mortgage Report II, Focus on Fulfillment, by Posner and Courtian, Feb. 10, 2000, Morgan Stanley Dean Witter. See also W. R. Hambrecht analyses on E-Loan.

In addition, the secondary market devotes significant resources towards auditing the loans prior to the actual purchase from the primary market (i.e., "Quality Control"). Although there are no published industry statistics available regarding the costs of auditing the information by the secondary market investors, research has indicated that the costs are much higher than those incurred by the broker.

Primary Market—Traditional Processes

The avenues for financing in the primary market are mortgage brokers ("wholesale brokers") and retail lenders. Brokers at retail lenders traditionally reside at the financial institutions' branch ("retail brokers"). Today, companies such as E-Loan (www.eloan.com) provide another avenue for consumers. Most of them purport to be on-line brokers, but many actually fund loans themselves. For example, 88% of E-Loan's portfolio was funded directly by E-Loan in 1999.

One of the functions of wholesale brokers is to match borrowers' requirements to various lenders' offerings. Retail brokers take orders from customers manually and match them to their financial institutions' offerings. Online brokers take orders from customers online. Once an application is taken, the broker obtains a credit report and a "pre-approval" from the secondary market. The secondary market investor pre-approves a loan conditionally, giving an indication to the broker and the borrower that the secondary market will buy the loan from the primary lender if all the conditions are met.

Once the pre-approval is obtained, the borrower can decide whether to proceed with the full application. If the borrower decides to proceed, a processor who works with a broker processes the loans by fulfilling the conditions. Hence the process is sometimes known as fulfillment.

Online brokers have come to realize that they need to invest in large back-end processing centers to fulfill the verification requirements, whereas traditional retail brokers already have these processors in place. Both have realized that the processing is an inefficient, unprofitable side of the mortgage industry. Unfortunately, no electronic infrastructure currently exists for any broker to plug their front-end applications into an automated verification platform.

Referring now to FIGS. 1A-1B, a conventional primary mortgage transaction flow diagram is illustrated. At step 101, a loan starts with a borrower entering information on a loan application and submitting it to a lender. The loan application may be a paper document which is completed by borrower and submitted to the lender. Some loan applications are available on a terminal at the lender's retail branch (i.e., PC-based), or on the Web. Such electronic applications mimic the physical forms used in the secondary market, e.g., Fannie Mae's Forms 1003 and 1008. All steps refer to those shown on the process flow diagrams.

The loan application is part of a lender's loan management system, also known as Loan Origination Systems (LOS), part of which is the front-end loan application. Lenders can have their own LOS, or can use commercially available systems from companies such as Keystroke (www.keystroke.com), Dorado (www.dorado.com) or GHR Systems (www.ghrsystems.com).

The information requested on the loan application falls into two major types: borrower specific and property specific. Borrower specific information typically includes:

- Name of borrower (and co-borrower if applicable)
- Social Security Number (co-borrower if applicable)
- Current and former addresses
- Current and former employers
- Current income
- Amount of funds/assets (savings, checking, investments, current house)
- Amount of liability (mortgage, credit cards)
- Current expenses
- Where the down payment will come from
- Property specific information typically includes:
- Location of property (i.e., address, county)
- Type of property (e.g., condominium or house, single or multiple family)
- How it will be held (e.g., tenancy in common)
- Who is the current owner and liens (i.e., title and clouds)

The loan application may not have the property-specific information as borrowers can obtain a loan subject to property identification.[4] The lender may also request photocopies of certain information, such as income tax returns and most recent pay stubs from the borrower at the time of the application to verify income and employment.

[4] In certain geographic areas, e.g., the San Francisco Bay Area, a borrower needs to have a loan "pre-approved" before the borrower even seeks out a property to buy.

After the borrower provides his or her personal information to the lender, at step 103, the lender's system orders and receives credit reports. The credit reports can come from one of three vendors Experian, Equifax, and Transunion. These reports are requested and returned via facsimile or regular mail, or electronically via dial-up or the Internet. The credit report is then "scored" using proprietary algorithms, the most common of which is the FICO supplied by Fair Isaac and Company.

At step 105, the application form, and the credit report are passed into the automated pre-approval (AP) system such as LOAN PROSPECTOR from Freddie Mac. AP systems are applications provided to the lender by the secondary market to perform the "pre-approval" process.

At step 107, the secondary market returns a "preapproval" with certain lending conditions from their AP systems either electronically to the lender's loan management system or by fax. In situations when automated preapproval may not be appropriate, a human underwriter will review the applications and create the conditions. Lending conditions are action items that need to be completed in order for the lender to be assured that the loan will be bought by the secondary market buyer who pre-approved the loan once the lender funds the loan. These conditions have standardized codes. For example, one of the conditions may be the request for a preliminary title report. The AP also has a code identifying the loan so that when the loan is eventually sold, it can be matched back to the information already on the secondary market's AP database. Additionally, the lender's underwriters may add conditions beyond what is provided by AP.

Certain conditions, such as verification of employment, can be satisfied prior to property identification. In such a situation, at step 109, the lender orders verification of employment documents from a service provider, verification of income documents from another service provider, such as the Internal Revenue Service ("IRS"), and verification of deposits and funds documents from yet another service provider.

When the verification of employment is requested, the service provider must designate a human representative to actually review the request to ensure that the lender has all the information and borrower authorization needed to process the request.

In addition, currently, the IRS fulfills the verification of income manually. A borrower signs an income tax return release authorization form. In cases where income tax information is required, the broker or lender sends the request for prior year tax return to the IRS. The IRS will research the matter, and fax or mail back a copy to the requester.

The verification of deposits and funds is the process by which deposits at a bank or funds at a stockbroker can be verified. Currently, there is no centralized system or automated system to collect such information, although the banking industry may be in the process of standardizing on the use level 3 digital certificates, such as those provided by Digital Signature Trust (DST, www.digsigtrust.com) to facilitate this verification.

At step 111, the borrower identifies a particular property and provides the address to the lender. Then at step 113, the lender will request property specific information. In particular, the lender will request a preliminary title report, typically by calling a title company and faxing or mailing information regarding the property to the title company. The lender will also recommend an appraiser to appraise the property. The lender will contact the appraiser by telephone, who will set up an appointment with the seller or the seller's agent to visit the property and prepare an appraisal. The appraisal is then prepared by completing a form and faxing or mailing the document to the lender. Some appraisal reports may be electronically mailed in a fixed display format (e.g., Adobe Systems' PDF). In addition, the lender will also set up an escrow account.

The lender compiles the property specific information as it is received at step 115 and evaluates the information at step 117 to determine whether the borrower's criteria match the lender's guidelines. If the package lacks information needed to satisfy the pre-approval, at step 119, the lender requests clarification from the service providers. If the package contains all the information needed to satisfy the pre-approval conditions after the processor review, the normal course of action is to send the loan package to the underwriting department at step 121.

A human underwriter reviews the loan package for accuracy and completeness at step 123 and at step 125 makes judgements as to whether additional verification needs to be done based on the lending institution's underwriting rules. If certain information contradicts what the applicant stated in its application (e.g., single family house versus multifamily house), the loan may be sent to AP for re-approval. New conditions may arise and steps 107 through 125 may be repeated in part.

If the loan package has errors, the documents are returned to the lender at step 127 for further processing. If the documents are acceptable to the underwriting department, it will issue loan documents at step 129. Once the documents are prepared, the lender notifies the escrow agent that the documents are ready to be signed. The escrow agent then notifies the borrower to go into the escrow office to sign the documents. Then, the borrower manually signs a litany of paper documents and returns them to the lender at step 131. A notary witnesses the signature and signs the documents as well.

One of the problems with manual signatures is that unauthorized use of the signed documents may arise. Processors or lenders may instruct borrowers to sign the documents but not date them. Once the borrower leaves, these lenders are then able to make photocopies of the signed documents and add dates at their discretion without the borrower's knowledge or consent. The lender or processor can then submit the loan documents to service providers on subsequent dates and multiple times to monitor a borrower's financial status. For example, every two years the lender may complete and resubmit the borrower documents requesting IRS information by just using a photocopy of the borrower's loan documents and filling in a more recent date.

Even if the borrower signs and dates the loan documents, a lender or processor is still able to "white out" the date field and resubmit the loan documents to service providers on subsequent dates and multiple times, without the borrower's knowledge or consent.

By dealing with paper transactions, there is ample opportunity for a lender, processing agent, or other intermediary to manipulate the documents. Typically, lenders and processing agents are paid based on a commission or fee received when the borrower's loan is funded. Thus, these entities have an incentive to close deals. With such incentive, these entities may manipulate data in order to ensure the deal closes. For example, information in an appraisal may be changed in order to allow the borrower to satisfy a loan-to-asset ratio. Thus, a need exists to prevent intermediaries from manipulating data provided by the service providers and data provided in the loan documents after they have been signed by the borrower.

Once the documents have been signed, at step 131, the lender sends the documents to the underwriting department at step 133 for the underwriter to perform a final manual review (if they choose to). If the documents fall within underwriting guidelines, the underwriter instructs the funding department to wire the money to the escrow agent.

At step 135, the escrow agent will record the title deed, the loan documents, and other liens as needed. This is typically performed manually by having the title company send a messenger to the county recorder office. The county will then issue a recordation number. Based on the escrow instructions, the escrow officer will disperse the funds to the parties, such as: current lien holders (i.e., paying off existing mortgage, if any), seller, lender (points), fire insurance, and the title company.

FIG. 2 illustrates a conventional funding process between the lender and the secondary market, known as the forward sale. At step 201, a mortgage (lender) bank negotiates a rate commitment for a specific volume of a specific loan product from a conduit bank (i.e., secondary market investor). For example, the mortgage bank may negotiate a rate commitment for $10,000,000 of 30-year fixed rate loans. The mortgage bank pays the conduit bank fees for the rate commitment. The commitment contract between the mortgage bank and the conduit bank specifies the type of loan product, such as a 30-year fixed loan; the length of commitment, such as 6 months; the fees to be paid by the mortgage bank; penalties for failure to meet the commitment; and the negotiated time for settlement, which is typically four weeks from the time the loan is funded and submitted to the conduit bank to the time the conduit bank pays the mortgage bank.

The long time for settlement has many disadvantages. First, the mortgage bank is burdened with low cash flow. Prior to settlement the mortgage bank has provided funds to the borrower to complete the loan. It is not until settlement that the conduit bank reimburses the mortgage bank for those funds. Thus, during the interim the mortgage bank may be low on cash. Second, the mortgage bank is also burdened with an interest rate risk. If the interest rates go up during the settlement period, the mortgage bank may have to obtain cash elsewhere at a higher interest rate to cover the loans to new borrowers.

Typically, a warehouse bank issues a line of credit to the mortgage bank. Drawing upon its warehouse line of credit at a warehouse bank to complete the loans to borrowers, the mortgage bank generates and closes loans at step 203 as illustrated in the flowchart of FIG. 2. At step 205, the mortgage bank disburses cash to the property seller via title/escrow.

At step 207, the mortgage bank's secondary market desk maintains an inventory of loans issued to the borrowers on a spreadsheet to ensure compliance with the commitment contract. In addition, at step 209, loans are manually reviewed for quality control by the quality control ("QC") department before being sent to the conduit bank. Since the manual review process is very time consuming, typically the QC department is only able to do a sample (e.g., 10%) review of the loans. Thus, a significant number of loans are not reviewed. Moreover, in addition to being time consuming, the processes generate a lot of paper because the mortgage banker must retain a copy of the documents that are sent to the conduit. Until the loans are accepted and paid for by the conduit bank, the mortgage bank is the lender of record and must maintain the documents.

At step 211, after each loan is closed and quality controlled, paper loan documents are sent to the conduit bank. At step 213, the conduit bank performs its own due diligence including matching the internal database for fraud, checking the accurate and completeness of documents, and performing a re-underwriting. Since the volume of documents is large, these steps can only be done through random sampling. Such random sampling may include ten percent of the loan documents at best, and the conduit bank's due diligence may take 30-45 days to complete.

If the loan documents are satisfactory, the process proceeds to settlement at step 215. At this step the conduit bank transfers the money to the mortgage bank's warehouse bank to replenish the mortgage bank's warehouse line of credit. The time depends upon the contractual agreement between the mortgage and the conduit banks. As discussed above, there are many disadvantages to such a long settlement period. Thus, a need exists to shorten the settlement period and limit the manual quality control process.

An alternate conventional funding process, known as the flow sale, is illustrated in FIG. 3. In such process, there is no volume or interest rate commitment between the mortgage banker and the conduit. The only commitment is that the conduit will provide an interest rate to the mortgage bank on a spot basis, and will accept loans underwritten in accordance with the conduit bank's guidelines for that interest rate. A lender receives a request for a rate lock on an interest rate from a borrower at step 301. At step 303, the mortgage bank looks up rates from a conduit (investor) bank and provides the available rates to the borrower at step 305. Once the mortgage bank receives confirmation of the interest rate lock from the borrower at step 307, the mortgage bank locks in the interest rate lock with the conduit at step 309. This alternate conventional funding process then follows steps 209, 211, 213, and 215 of the conventional forward sale process discussed above with reference to FIG. 2. As a result, this alternate conventional funding process has the same undesirable long settlement period.

Yet another conventional funding process, the bulk sale, is illustrated in FIG. 4. The forward and flow sale processes discussed above with reference to FIGS. 2-3 constitute the majority, in terms of volume, of the loans for lenders. This bulk sale process is typically used for "alt-a" and sub-prime loans for borrowers with higher risk profile. These loans can be more profitable than prime loans and can be used to increase overall portfolio return. The bulk sale differs from the forward and flow sales in that there is no agreement between the mortgage bank and any conduit before the loan is funded. In a bulk model, the mortgage bank underwrites the loan in a generic enough manner that it can be sold to a few conduit banks. The mortgage bank funds the loan from its own line of credit, and then tries to find a buyer for these loans.

The bulk sale process begins with a step similar to step 203 of the forward sale lending process illustrated in FIG. 2 when a mortgage bank underwrites and closes a loan, drawing upon its warehouse line of credit at a warehouse bank to complete the loan. The process continues with steps 205 and 207 of the forward sale lending process.

After step 207 of the forward sale lending process illustrated in FIG. 2, the process continues with step 401 of the flow chart illustrated in FIG. 4. At this step 401, the mortgage bank packages a set of bulk loans and finds buyers, sending them a spreadsheet of these loans and offering to sell the loans at a certain price. At step 403, conduit banks review loans before purchasing and perform due diligence. For loans that are satisfactory, the conduit bank wire transfers money, at step 405, to the mortgage bank's warehouse bank to replenish the mortgage bank's warehouse line of credit. This settlement period usually takes four to six weeks. Unsatisfactory loans are either rejected or negotiated for a lower price.

The conventional lending process is an expensive and time consuming paper intensive process. Thus, a need exists to automate the information gathering and auditing processes of the primary market and secondary markets and to reduce the settlement periods.

SUMMARY OF THE INVENTION

In accordance with one embodiment of the present invention, a method for automatically fulfilling lending conditions includes the steps of maintaining a database of a plurality of registered service providers, receiving a loan application having one or more conditions to be fulfilled for the loan application to be approved, evaluating the one or more conditions to determine one or more actions to be taken towards fulfilling the one or more conditions, and automatically executing at least one action of the one or more actions to be taken towards fulfilling at least one of the one or more conditions, wherein the at least one action includes automatically requesting information for fulfilling the at least one condition from a registered service provider of the plurality of registered service providers.

As a result, the present invention automates the information gathering and auditing processes of the primary market and secondary markets. A processor maintains a database of registered service providers. This database maintains data about registered service providers, such as the service each service provider provides, as well as the name, address, and registration information for each service provider. The processor receives a loan application having a list of conditions that need to be fulfilled for the loan to be funded. For example, a condition may be to verify the loan applicant's bank account. The processor then evaluates the conditions to determine what actions need to be taken to satisfy the conditions, and automatically executes those actions that can be taken towards fulfilling the conditions.

In one embodiment, the processor maintains a look-up database to assist in the evaluation of the conditions and the execution of the actions. This look-up database maintains data about conditions and corresponding actions to be taken to fulfill the conditions. Thus, the processor compares the list of conditions to be fulfilled with the conditions stored in the look-up database and selects those stored conditions matching those conditions listed. Based on these selected conditions, the processor can determine the corresponding actions to be taken to fulfill the conditions.

In one embodiment, the processor also maintains a lender database of lender information, such as preferred registered service providers for each service. The processor automatically executes the actions by determining from the stored actions a service having information to fulfill the corresponding condition, selecting from the lender database a preferred registered service provider that can provide the service, and automatically sending a request to the selected preferred registered service provider for information to fulfill the conditions.

In yet another embodiment of the present invention, when the conditions for the loan have been fulfilled, the processor uses the information obtained from the service providers to automatically generate loan documents for signature by the borrower. In still another embodiment, the processor can accept an electronic signature and a biometric signature of the borrower.

In a further embodiment of the present invention a method for automatically settling a loan includes the steps of providing data for one or more loans to one or more registered financial institutions, receiving a request from one of the registered financial institutions to review one of the loans, providing the registered financial institution with a predetermined time in which to reject a sale price of said one loan, and automatically settling said loan at the sale price when said one registered financial institution accepts, and alternatively fails to reject, the sale price of the loan before the predetermined time expires. In one embodiment, the loan is automatically settled by instructing the registered financial institution send payment to a settlement financial institution. With such automated settlement process, the settlement period in a lending process can be significantly reduced.

Other advantages of the present invention will be apparent from the description of the preferred embodiment and corresponding drawings.

BRIEF DESCRIPTION OF THE DRAWINGS

FIG. 7 is an illustration of exemplary records of the lender database of the controller of FIG. 6.

FIG. 8 is an illustration of exemplary records of the service provider database of the controller of FIG. 6.

FIG. 9 is an illustration of exemplary records of the loan database of the controller of FIG. 6.

FIG. 15 is an illustration of exemplary records of the look-up database of the controller of FIG. 6.

DETAILED DESCRIPTION OF THE PREFERRED EMBODIMENT

Figure 1A:
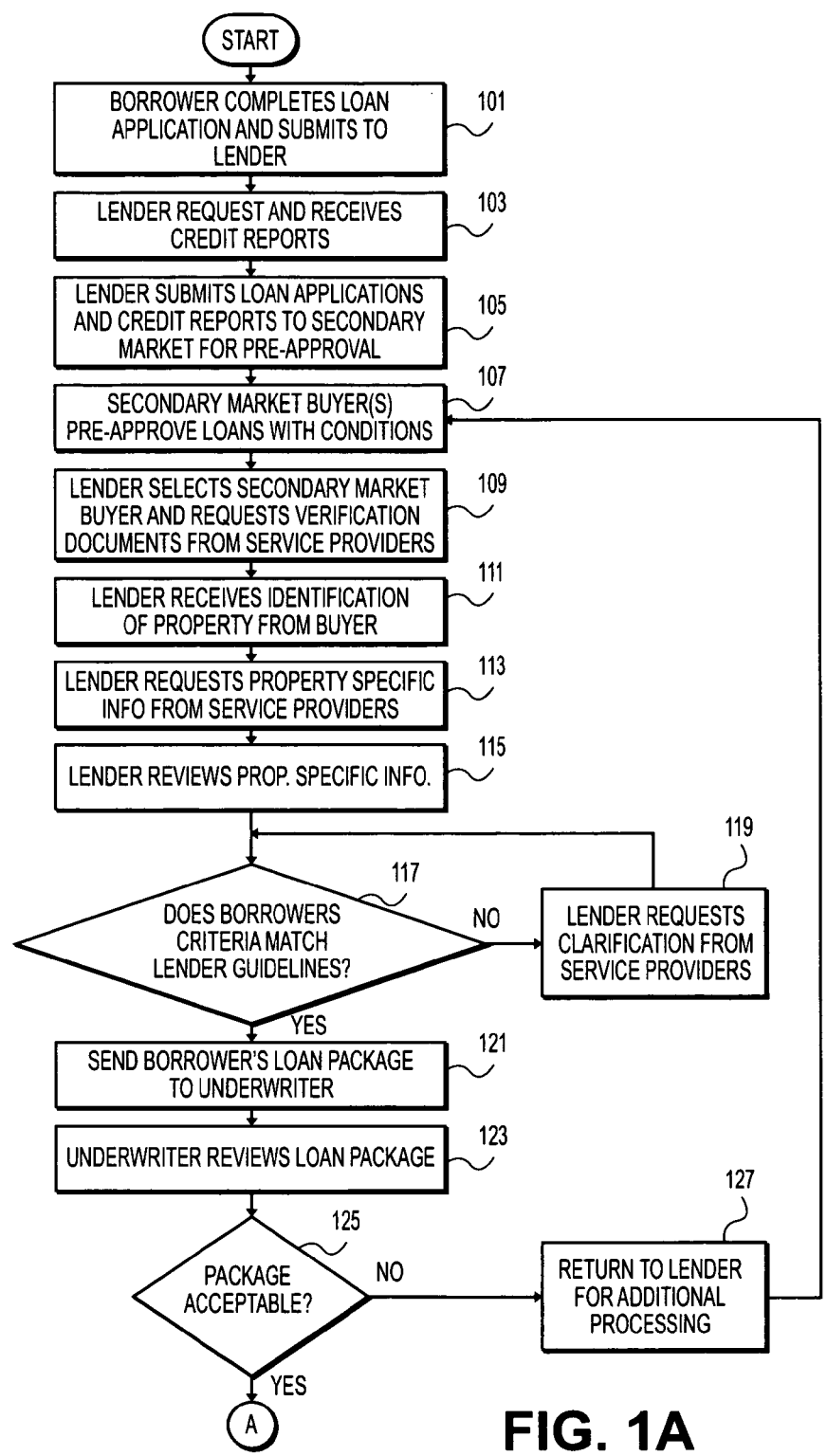
FIGS. 1A-1B are flowcharts of a conventional lending process.
Figure 1B:
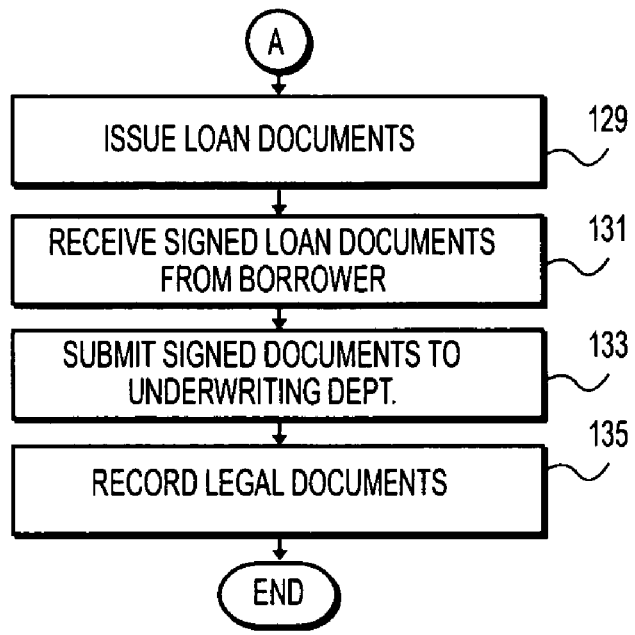
Figure 2:
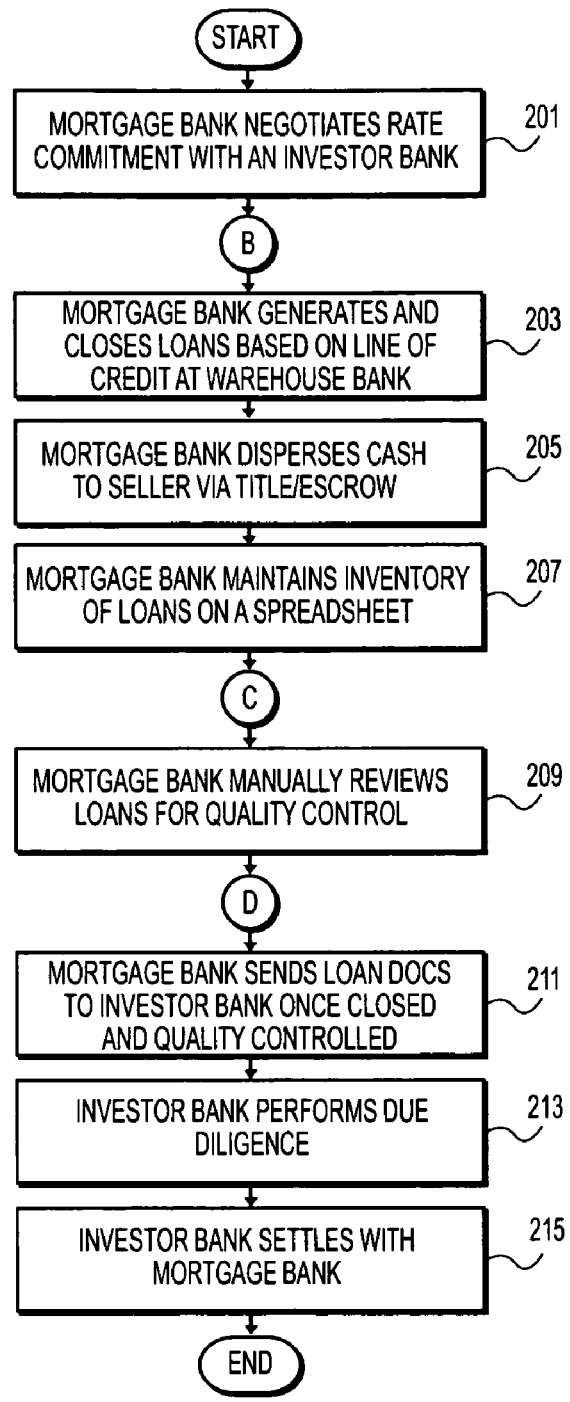
FIG. 2 is a flowchart of a first conventional funding process.
Figure 3:
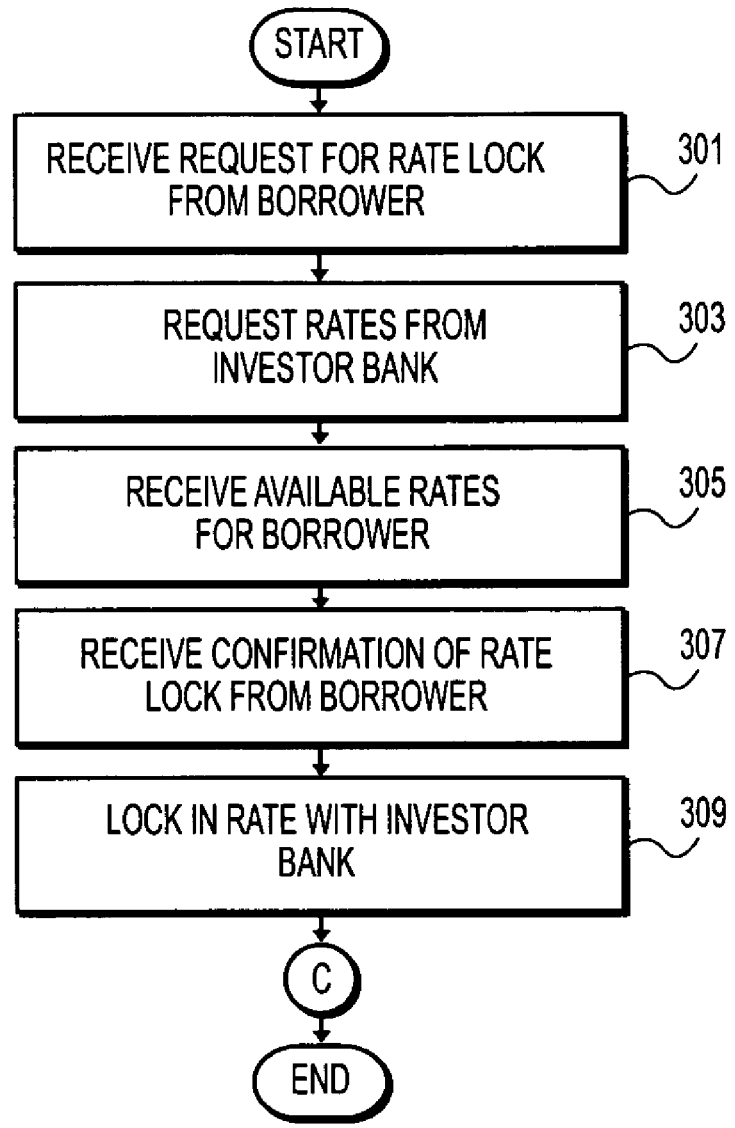
FIG. 3 is a flowchart of a second conventional funding process.
Figure 4:
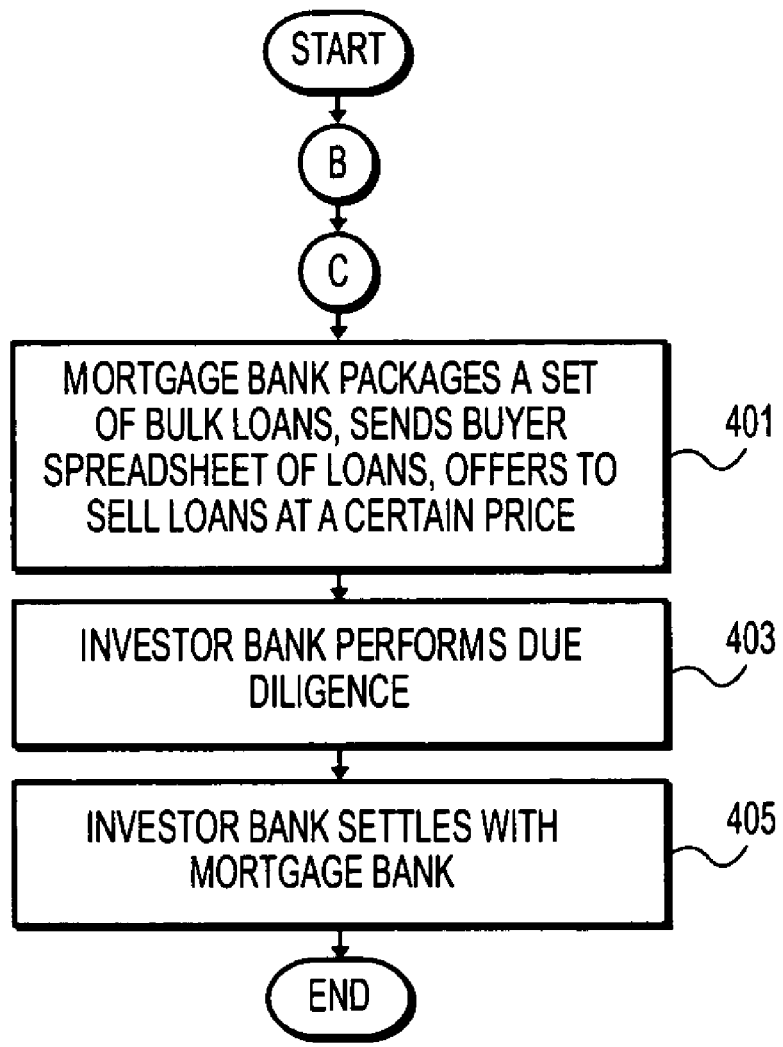
FIG. 4 is a flowchart of a third conventional funding process.

The present invention may be embodied as a computer program developed using an object oriented language that allows the modeling of complex systems with modular objects to create abstractions that are representative of real world, physical objects and their interrelationships. However, it would be understood by one of ordinary skill in the art that the invention as described herein can be implemented in many different ways using a wide range of programming techniques as well as general purpose hardware systems or dedicated controllers.

The present invention provides the complete automation of data gathering and quality control for the brokers, lenders, and secondary market investors. The present invention is provided through a platform that can be directly integrated into each customer's loan origination systems ("LOS") front end. Lenders can have their own LOS, or can use commercially available systems from companies like Dorado (www.dorado.com), Keystroke (www.keystroke.com) and GHR Systems (www.ghrsystems.com). The direct integration can be customized and branded to the inventors' customers graphical user interface so that training costs are reduced or eliminated.

The platform uses business rules and technology so that once a borrower authorizes a lender to proceed with a loan, the system automatically: verifies employment, income, and credit history, obtains or confirms deposits of funds and other investment assets, confirms income reported on income tax returns, and obtains preliminary title reports and property appraisals.

When information is deposited onto the platform, and ready for review, the system notifies the lender (in particular, the processor) electronically. There is also a time-driven process such that the processor is notified of information that is still missing after a predetermined time. Once the information package is complete and reviewed by the processor, the lender's underwriting department is notified to review and approve the loan package. This loan package or digital loan record ("DLR") actually does not physically leave the platform, but resides securely on the platform. In this way, the DLR retains absolute information integrity. An additional benefit for having the information resident on the platform is the elimination of the costs associated with assembling a paper loan package. Finally, it avoids the issues related to the concepts of transferring "originals" and "copies" among various parties for review and approval. In the digital world, originals and copies are identical. To try to conform computer records into this paradigm requires complicated storage and authentication technologies, a wide bandwidth for transferring the records from one user to another, and the large storage requirements to house the records by all parties.

To further assist customers in its automation efforts, the platform can be used to host customers' business rules or underwriting guidelines. This allows, for example, an underwriting division of a lender to determine whether a loan processed through the platform needs human intervention or additional verifications, thereby increasing their staff's productivity.

Finally, to enhance the quality control function, the platform has built in data mining capabilities so that lenders can identify bottlenecks in their systems or processes, and analyze and aggregate borrowers behavior or trends.

System Architecture

Figure 5:
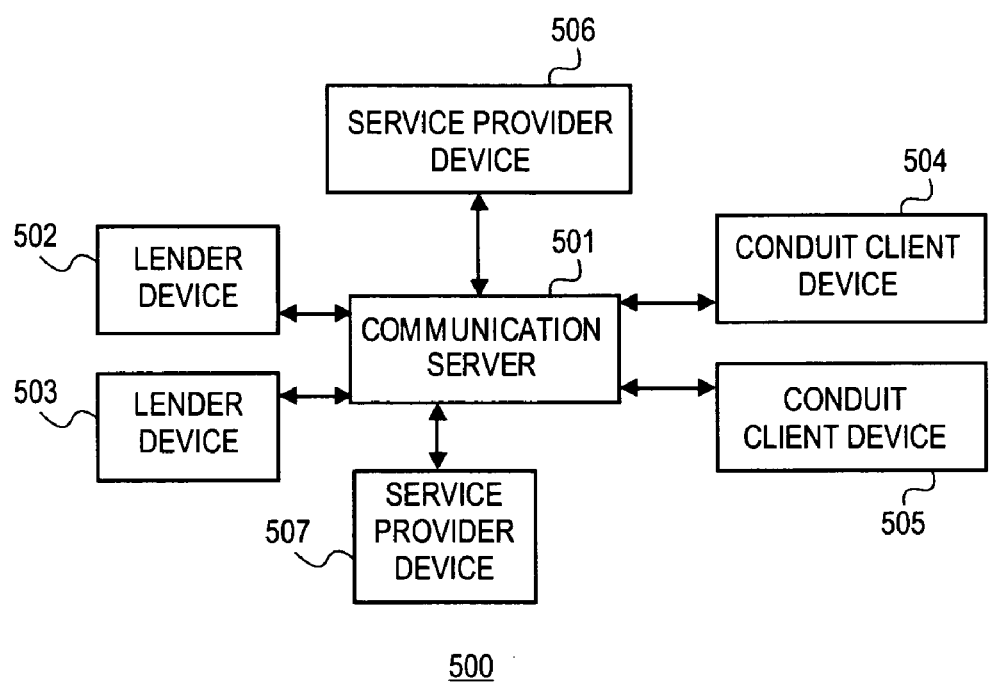
FIG. 5 is a schematic illustration of a system for managing loan products in accordance with the present invention.

An example of a system embodying the present invention is illustrated in FIG. 5. A system 500, according to the present invention includes a communication server 501 in communication with one or more lender devices 502, 503 (two are shown in FIG. 5 for illustrative purposes only, more or fewer lender devices can be supported), one or more conduit client devices 504, 505 (two are shown in FIG. 5 for illustrative purposes only, more or fewer conduit client devices can be supported), and one or more service provider devices 506, 507 (two are shown in FIG. 5 for illustrative purposes only, more or fewer service provider devices can be supported). Although reference is made throughout the specification to mortgage or lender banks and conduit or investor banks, it will be appreciated by one of ordinary skill in the art that the present invention is applicable to any type of financial institutions. Such reference to the mortgage industry financial institutions is merely for exemplary purposes.

The communication server 501 can be embodied as a system controller, a dedicated hardware circuit, a programmed general purpose computer, or any other functionally equivalent configurable electronic, mechanical, or electromechanical device. Communication server 501 operates as a primary server and is preferably capable of high volume processing, performing a significant number of mathematical calculations in processing communications and database searches. Communication server 501 may be a conventional personal computer or a computer workstation with sufficient memory and processing capability. For example, a PENTIUM™ microprocessor such as the 100 MHZ P54C microprocessor, commonly manufactured by Intel, Inc., may be used for CPU 601. This processor employs a 32-bit architecture. Equivalent processors include the 120 MHZ POWERPC 604 microprocessor, manufactured by Motorola, Inc. or the 166 MHZ ULTRASPARC-I microprocessor, manufactured by Sun Microsystems, Inc.

The lender, conduit, and service provider devices 502-507 can likewise be embodied as dedicated hardware circuits, programmed general purpose computers, personal computers, televisions, telephones, pagers, palmtop computers, or any other flnctionally equivalent configurable electronic, mechanical, or electromechanical devices. The devices can be in communication with the communication server 501 via a network such as a Local Area Network (LAN), a Wide Area Network (WAN), a Public Switched Phone Network (PSTN), a cable network, or an Internet Protocol (IP) network, such as an intranet, extranet, or internet. Communication may also be provided by dedicated data lines, cellular, Personal Communication Systems ("PCS"), microwave or satellite networks. Using these components, the present invention provides a method, apparatus and system for managing loan products.

Figure 6:
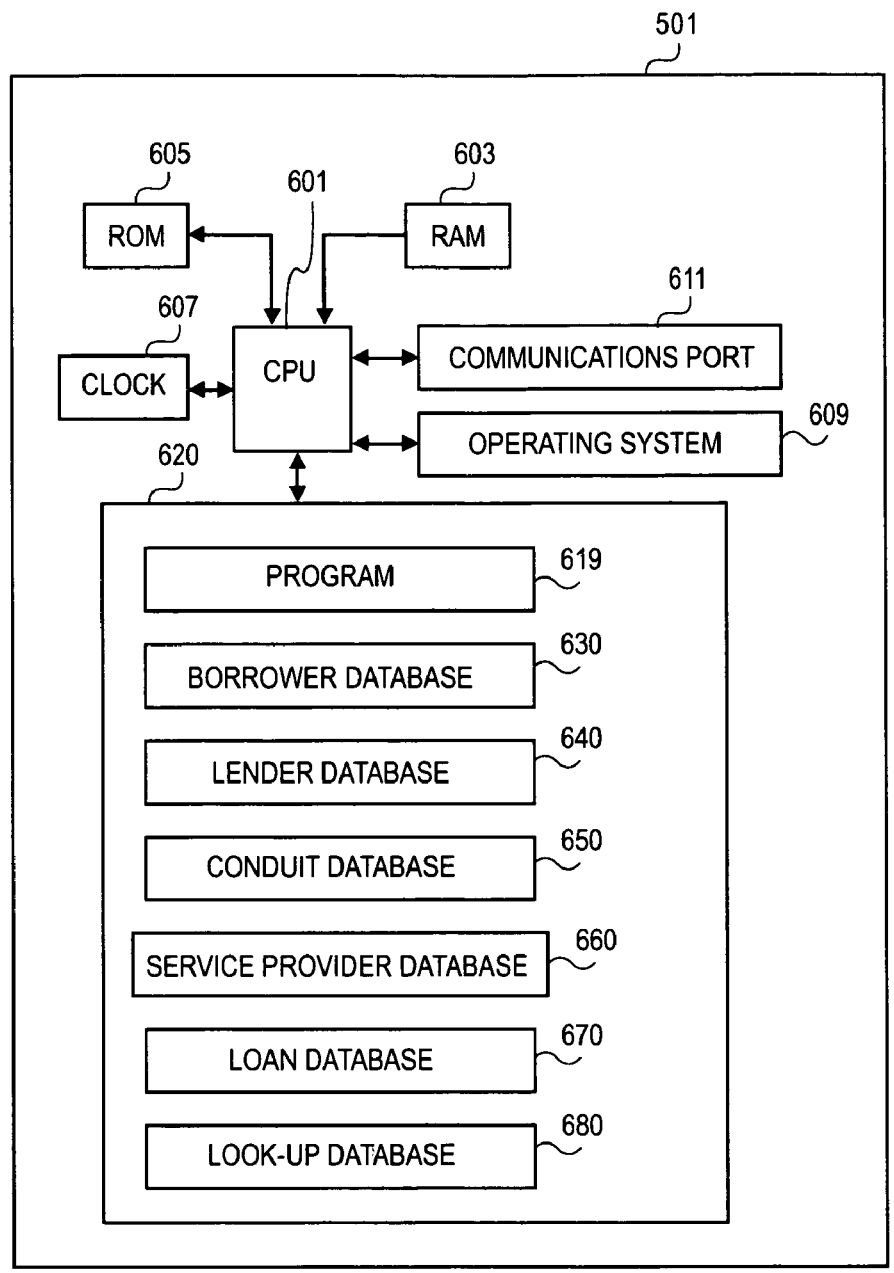
FIG. 6 is a schematic illustration of a controller of the system of FIG. 1.

Referring now to FIG. 6, block diagram of an embodiment of communication server 501 is illustrated. Communication server 501 includes a central controller preferably a central processing unit (CPU) 601, RAM (Random Access Memory) 603, ROM (Read Only Memory) 605, a clock 607, an operating system 609, a communications port 611, and a data storage device 620. All of these elements are connected to CPU 601 to facilitate communication between them.

Operating system 609 comprises a conventional operating system such as DOS or WINDOWS operating system software, manufactured by Microsoft Corporation, the OS2 operating system software, manufactured by International Business Machines, Inc., or Solaris, manufactured by Sun Microsystems, Inc.

Data storage device 620 may be implemented using a persistent memory system which may include random access memory, flash memory, hard disk drives and/or other appropriate combination of electronic or optical data recording units, which include CD-ROM drives and micro-disk drives. The processor 601 and the data storage device 620 may each be (i) located entirely within a single computer or other computing device, (ii) connected to each other by a remote communication medium, such as a serial port cable, telephone cable, telephone line or radio frequency, or (iii) a combination thereof. In one embodiment, the communication server 501 may comprise one or more computers that are connected to a remote server computer for maintaining databases.

In a preferred embodiment, where the processor 601 is a general purpose microprocessor, the data storage device 620 stores program 619 which includes instructions for controlling the processor 601. The processor 601 performs instructions of the program 619, and thereby operates in accordance with the present invention, and particularly in accordance with the methods described in detail herein. The program 619 may be stored in a compressed, uncompiled, and/or encrypted format. The program 619 further includes elements that may be necessary, such as an operating system, a database management system and "device drivers" for allowing the processor 601 to interface with computer peripheral devices. Appropriate device drivers and other necessary program elements are known to those skilled in the art, and need not be described in detail herein.

In the embodiment of FIG. 6, the program 619 stores data accumulated, or computed by, the processor 601 on the data storage device 620. This stored data is preferably organized and indexed in one or more related relational databases 630, 640, 650, 660, 670, and 680. It will be appreciated that these databases may be organized as object oriented, relational, hierarchical file systems, database systems, or any suitable data organization scheme.

In the example embodiment illustrated in FIG. 6, the related relational databases include a borrower database 630, a lender database 640, a conduit database 650, a service provider database 660, a loan database 670, and a look-up database 680 although some or all of these databases and/or other databases may be included. In a preferred embodiment, database software such as Oracle 9i, manufactured by Oracle Corporation, creates and manages these databases. Each of the databases 630, 640, 650, 660, 670, and 680 are described below. Any schematic illustrations and accompanying descriptions of the databases presented herein are exemplary arrangements for the stored information. As will be understood by those skilled in the art, a number of other arrangements may be employed besides those discussed. One of ordinary skill in the art would recognize that the database fields and records discussed and illustrated in FIGS. 7-9 and 15 are for illustrative purposes only, and that the databases 630, 640, 650, 660, 670, and 680 could contain any number of fields and records.

Borrower database 630 maintains data about borrowers and, in one embodiment, includes fields such as name, address, phone number, ID number, social security number, electronic mail address, and credit rating. This information is preferably obtained when the lender first submits a loan application to the system.

Lender database 640 maintains data about lenders registered with the system and is explained in more detail with reference to FIG. 7. The registration process ensures the lenders are legitimate and that the loan packages they post conform to the data format specifications. An exemplary lender record 700 from the lender database 640, is illustrated in FIG. 7. As shown, lender database 640 maintains data on lenders with fields 701-718, such as, such as lender name field 701, address field 702, contact information field 703, identification field 704, password field 705, lender rating field 706, access level field 707, warehouse bank information field 708, preferred service provider fields 709-711, preferred secondary market investors field 712, underwriting rules and guidelines field 713, quality control guidelines field 714, commitment contracts field 715, preferred data interchange format field 716, server address field 717, server certificate authority field 718. The information in this database 640 may be updated by the lender, by the lender logging onto system 500.

The name, address, and contact information, such as telephone, fax and cell phone numbers, e-mail and website addresses, of the lender are stored in fields 701-703, respectively. A lender's unique login identification and password, which enable the lender to logon to the system 500, are stored in fields 704-705 respectively. A lender rating is stored in field 706. This rating is typically based on the lender's historical performance, such as lending volume and asset size. For example, in the exemplary lender database 640 illustrated in FIG. 7, ABC Lending Co. has a lender rating of 8 on a scale of 1 to 10, 10 being the highest rating. Access level field 707 stores the level of access the lender's employees have to the loan records. In one embodiment, the access level may be indicated by an employee's name, as illustrated in FIG. 7. In another embodiment, the access level may be indicated by an employee's rank. For example, a processor has record level write and edit access, whereas an underwriter may have read access to the record but not edit access. Warehouse bank information field 708 stores the name, address, contact information and routing number of the lender's warehouse bank.

Fields 709-711 store the names, addresses, contact information, and registration information of the lender's preferred service providers. For example, in the exemplary lender database 640 illustrated in FIG. 7, ABC Lending Co.'s preferred employment service provider is LB Employment Service Provider and its preferred title company is USA Title Co., both of which are registered with system 500. ABC Lending Co. has not indicated a preferred appraiser. It will be appreciated by one of ordinary skill in the art that other preferred service provider fields may be included in lender database 640.

The lender's preferred secondary market investors are stored in field 712. These are the secondary market investors with whom the lender prefers to do business or with whom the lender has an established relationship. For example, ABC Lending Co.'s preferred secondary market investors are ABC Bank, which is registered with system 500, and DRE Bank, which is not registered with system 500. Since DRE Bank is not registered with system 500, the system 500 is unable to conduct server-to-server or other automatic communications with this bank. Human intervention, such as by a processor, is required to communicate with this bank. But, the system would register DRE Bank as quickly as possible so that there would not be an off-line process (i.e., human intervention would not be necessary).

The lender's underwriting rules, guidelines and other criteria are stored in field 713. As with all the data in the relational databases, it will be appreciated by one of ordinary skill in the art that these rules, guidelines, and other criteria may be stored in fields of some tables. In other instances, this underwriting criteria may be stored in rules-engine software. For example, some conventional databases may have difficulty generating messages and action steps for the processor 501, so the underwriting criteria may be stored in such software.

Lenders may choose not to provide these rules and guidelines. But, if they are provided, system 500 will perform a preliminary check to determine whether the information in an applicant's loan package complies with the lender's underwriting rules and guidelines. For example, ABC Lending Co. has provided system 500 with two rules. One, system 500 should obtain the applicant's prior employment information if the applicant has been employed with its current employer for less than one year. Two, system 500 should obtain the applicant's bank records for the past year. It will be appreciated that these two rules are merely exemplary, lenders may choose to provide the system 500 with more and/or different underwriting rules and guidelines.

A lender's quality control guidelines, if any are provided to the system 500, are stored in field 714. For example, one quality control guideline may be to check that all Fair Credit Act, Fair Lending Act, and RESPA disclosures had been made and signed by the borrower. Another may to check that the borrower is no on their own internal fraud database. Again, the lender, such as ABC Lending Co., may choose not to provide these guidelines to the system 500.

Information regarding the lender's commitment contracts are stored in field 715. Such information may include pending as well as completed commitment contracts. Preferred data interchange format, such as, EDI or XML, is stored in field 716. The lender's server address and server certificate authority issuing the server certificates to the lender are stored in fields 717 and 718, respectively.

Referring again to FIG. 6, conduit database 650 maintains data about conduits registered with the system. In one embodiment, the database 650 includes fields (not shown) such as conduit name, address, contact information, ID number, conduit rating, access level, underwriting rules and guidelines, quality control guidelines, commitment contracts, preferred data interchange format, server address, and server certificate authority. These fields have been discussed above with reference to lender database 640 and need not be repeated.

Service provider database 660 maintains data about enrolled or registered service providers. Exemplary service provider records from service provider database 660 are explained in more detail with reference to FIG. 8. As shown, service provider database 660 maintains data on service providers with fields 801-812, such as service field 801, service provider name field 802, address field 803, contact information field 804, registration information field 805, identification field 806, password field 807, rating field 808, access level field 809, preferred data interchange format field 810, server address field 811, and server certificate authority field 812.

Service field 801 stores the type of service the service providers offer. For example, service provider information for the employment and bank services are stored in the exemplary service provider database 660 illustrated in FIG. 8. It will be appreciated that server provider database 660 may store service provider information for other services, such as appraisal and title services, as well. Service provider field 802 stores the names of the service providers that provide the service indicated in corresponding service field 801. For example, both LB Employment Service Provider and FG Employment Service Provider are employment service providers. Address and contact information, such as telephone, fax and cell phone numbers, email and website addresses, of the service providers are stored in fields 803-804, respectively.

In one embodiment of the present invention includes registered field 805 which stores information indicating whether the service provider is registered. In an alternate embodiment of the present invention, service provider database 660 stores only data for registered service providers. In such embodiment, registered field 805 would be unnecessary.

Each service provider's identification and password, which enable the service provider to logon to the system 500, are stored in fields 806-807, respectively. A service provider rating is stored in field 808. This rating is similar to the lender rating discussed above with reference to rating field 706 of lender database 640. Access level field 809 stores the level of access the service provider's employees have to the loan records and is similar to access level field 707 of lender database 640. The service provider's server address and server certificate authority issuing the certificate are stored in fields 812 and 813, respectively.

Loan database 670 maintains data about loans and is explained in more detail with reference to FIG. 9. One of ordinary skill in the art would recognize that the database records illustrated in FIG. 9 are for illustrative purposes only, and that the databases 670 could contain any number of records and be structured in multiple tables. An exemplary loan record 900 from the loan database 670, is illustrated in FIG. 9. As shown, loan database 670 maintains data on loans with fields 901-935, such as, loan identifier field 901, loan status field 902, borrower name field 903, borrower identifier field 904, credit rating field 905, claimed funds field 906, claimed deposits at a depository institutions field 907, claimed employer field 908, claimed title at current position field 909, claimed employment income field 910, claimed expenses field 911, claimed debt field 912, claimed other income field 913, actual funds confirmed field 914, actual deposits confirmed at depository institution field 915, confirmed employer field 916, confirmed title at current position field 917, confirmed income field 918, confirmed expenses field 919, confirmed debt field 920, current address field 921, property address for which the loan is applied field 922, type of property field 923, property appraised value field 924, current title of property field 925, post-purchase title of property field 926, loan applied amount field 927, initial deposits field 928, origin of deposits field 929, interest rates approved for field 930, points field 931, term of loan field 932, pre-approval case number field 933, secondary market investor field 934, and product number field 935.

When system 500 receives the loan package from the lender 501, 503, system 500 assigns the loan a unique identifier which is stored in loan identifier field 901 of loan database 670. The status of the loan, such as pending or funded, is stored in field 902. In a preferred embodiment, the dates regarding the status of the loan are also stored in field 902. For example, if the loan was funded on Jan. 15, 2000, both this date and the loan status would appear in field 902. The borrower's name and identifier are stored in fields 903-904, respectively. The borrower's credit rating is stored in field 905.

Fields 906-913 store information provided by the applicant on the loan application. For example, field 906 stores the amount of funds the applicant indicated on the loan application it has in a financial account, such as a brokerage account. Field 907 stores a deposit amount the applicant claims to have at a depository institution. The applicant's claimed employer, title, and employment income is stored in fields 908-910, respectively. The applicant's claimed expenses, debt, and other income is stored in fields 911-913.

System 500 requests borrower-specific information from service providers to verify the information provided by the applicant on the loan application. The verification information obtained from the service providers is stored in fields 914-920. For example, the amount of funds in the applicant's financial account, such as the brokerage account, is stored in actual funds confirmed field 914. The deposit amount the applicant actually has at a depository institution is stored in actual deposits confirmed at depository institution field 915. The applicant's confirmed employer, title, income, expenses, and debt information is stored in fields 916-920.

System 500 also requests property-specific information from service providers regarding the property the borrower wants to purchase. Information obtained from these service providers is stored in loan database 670. Exemplary fields in which such information may be stored include fields 921-927.

When the lender provides the loan package to system 500, the lender includes information regarding the loan and how much money the borrower will be putting towards the purchase price of the home. This would not apply in cases where the borrower is merely refinancing the home or obtaining a home equity loan. This information is stored in loan database 670. Fields 928-933 are exemplary fields in which this information may be stored.

Loan database also stores information on the secondary market investor in field 934 and a product number field 935.

Figure 10:
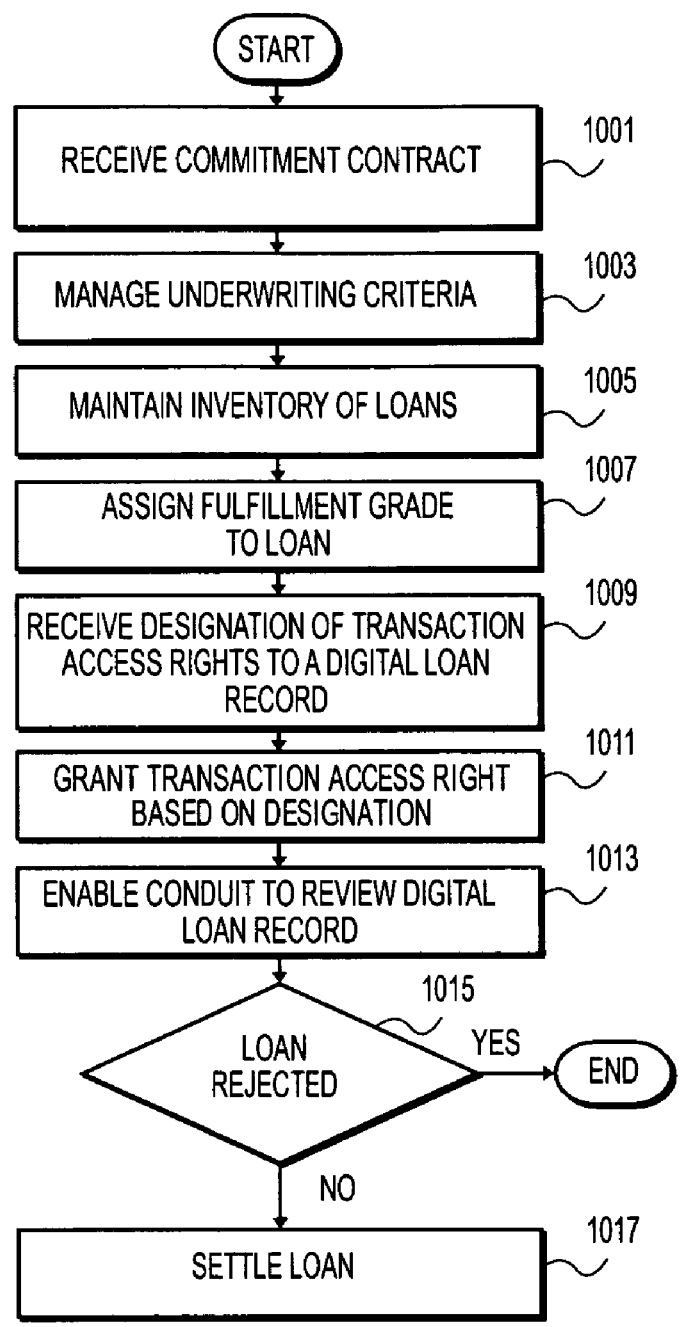
FIG. 10 is a flowchart depicting a first embodiment of a funding process in accordance with the present invention.

FIG. 10 illustrates a forward sale process in accordance with one embodiment of the present invention. The process begins when a mortgage bank negotiates a rate commitment for a specific volume of a specific loan product from a conduit bank (i.e., secondary market investor). As discussed above, although reference is made throughout the specification to mortgage or lender banks and conduit or investor banks, it will be appreciated by one of ordinary skill in the art that the present invention is applicable to any type of financial institutions. Such reference to the mortgage industry financial institutions is merely for exemplary purposes.

The commitment contract between the mortgage bank and the conduit bank specifies the type of loan product, such as a 30-year fixed loan; the length of commitment, such as 6 months; the fees to be paid by the mortgage bank; penalties for failure to meet the commitment; and the time for settlement. This commitment contract is then provided to system 500, typically by the mortgage bank, at step 1001.

In a preferred embodiment, the system 500 also manages underwriting criteria for various loan products at step 1003. In such embodiment, conduit banks provide the system 500 with their particular underwriting criteria, such as guidelines and rules, for certain loan products which may then be stored in conduit database 650. Such criteria inform mortgage banks of the kind of verification they need for a particular loan product. For example, the conduit bank may have a rule that for a 30-year fixed loan with a loan to value ration of less than or equal to 70%, the mortgage bank does not need to verify the applicant's income. The system 500 also provides the mortgage banks with the underwriting information corresponding to a particular loan product.

Managing underwriting criteria assists the system 500 in its automatically fulfillment process. Based on the underwriting criteria stored in conduit database 650, communication server 501 automatically carries out the actions for those guidelines for which it is capable, such as automatically sending requests to registered service providers for information. For those actions which it is unable to carry out automatically, communication server 501 notifies either a processor or an underwriter to carry out. Actions which communication server 501 may be unable to carry out automatically may be those involving non-registered service providers or those requiring manual intervention.

At step 1005, system 500 maintains an inventory of loans in loan database 670. The conduit or purchaser of the loan as well as the seller or mortgage bank, needs to be able to see and sort loans based on key fields, such as, contract number; product code; whether it is a prime or subprime loan; type of loan, such as an adjustable rate mortgage (ARM) or a fixed mortgage; origination date of the loan; address of the property; credit score (e.g., FICO score provided by Fair, Isaac and Co.); interest rate for the loan; loan amount; whether the property is owner occupancy; document levels, such as full, alternative or none (which represents the amount of documentation used to complete the loan); secondary financing; loan to value ratio; debt to income ratio; or name of the originating mortgage bank.

In an exemplary embodiment, the mortgage bank, also needs to be able to see and sort other information such as, margin if the loan is an ARM; a weighted average coupon rate; points; name of loan processor; name of underwriter; and name of buyer-conduit. Thus, some or all of this information would also be stored as part of the inventory of loans in loan database 670 on system 500.

An alternate embodiment of the present invention includes step 1007 in which the system 500 assigns a fulfillment grade to a funded loan. In one embodiment, this fulfillment grade is based on the reliability of the information, such as employment, income, and credit history information, obtained during the loan fulfillment process. The more reliable the information, the higher the fulfillment grade. In one embodiment, if information is automatically obtained from a service provider, the information may be deemed more reliable than information obtained manually. Thus, the loan will be given a higher grade. For example, if the employment information was obtained directly from a human resources database provided by an independent third-party such as, Talx, rather than from a phone call to a person claimed by the applicant to be the human resources representative for the employer, this information would be deemed more reliable. In such embodiment, if the system 500 verifies more than a first percentage, such as 90%, of information electronically or automatically, the loan may be given a grade A. If the system 500 verifies less than the first percentage but greater than a second percentage, the loan may be given a grade B. The percentages will actually be weighted based on the importance of the information being verified.

The secondary market desk at the mortgage bank performs quality control of the loan packages and designates the loans to be "transferred." The system 500 receives a designation at step 1009, from the mortgage bank indicating which conduit banks should be granted transaction access rights to which digital loan records.

Mortgage banks may grant various types of access rights, such as read access rights which permit the conduit bank to view, but not modify, information in the loan packages, and transaction access rights, which permit the conduit bank to conduct transactions with the loan package. There are two types of transaction rights, the rights to the notes receivable or actual loan, and the servicing rights which are the rights to collect and disperse funds to the owner of the notes receivable. The holder of the notes receivable holds the right to sell the notes receivable or loan. The servicing company of record is the only one who has the rights to append to the digital loan records to indicate the payment history of the loan. Although, former servicing companies, such as the mortgage bank, may have view rights. Only one financial institution can hold each transaction right at a time, although both rights may be held by the same financial institution at a time. In addition, the financial institution with the transaction rights may grant a view right to another financial institution prior to sale.

By transferring access rights, paper documents or digital loan records no longer need to be physically sent back and forth between entities, such as lenders, conduit banks, and servicing companies. In the present embodiment, the documents are maintained on the system 500 and access rights are provided to those entities or individuals who need to access the documents. Thus, the system 500 acts as a warehouse of data for all the entities.

In addition, by transferring access rights rather than documents, the secondary market is assured of the integrity of the information similar to the primary market in that the rights to the digital loan records are transferred only if the data integrity has not been violated. In addition, by providing the fulfillment grade, the secondary market is assured of the quality of the information. This significantly reduces the amount of auditing required by the secondary market investor.

Even if the loans are not generated on the communication server 501 platform, other digital loan records can be transferred into the communication server 501 platform for automated cross-verification, allowing secondary markets to use the communication server 501 platform for its auditing function. Because the platform is modular, any one party can integrate into the communication server 501 platform at different points in the information chain, provided that the communication protocols and business relations have been established. For example, if another platform wishes to use verify income and taxes with the Internal Revenue Service, it can establish the proper communication protocol and security requirements (such as using financial grade digital certificates), and send a request for the information through communication server 501.

Based on the designation received from the mortgage bank at step 1009, the system 500 transfers the designated access rights to the appropriate conduit bank at step 1011.

At step 1013, system 500 enables the conduit banks to review the digital loan records and associated fulfillment grade, if any, stored on system 500. The conduit bank is given a predetermined time, such as three days, in which to reject the loan if the loan package is not desired. In a preferred embodiment, the conduit and the mortgage banks have previously agreed upon the predetermined time in which the conduit bank has to reject the loan.

If the loan package is rejected within the predetermined time, the process ends. However, if the conduit bank accepts, or does not reject, the loan package within the predetermined time, the process automatically proceeds to settlement at step 1019. If no rejection or an acceptance is received, system 500 triggers the settlement process. Wire instructions for the principal loan amount and fees are sent to the warehouse/settlement bank, a servicing company, and a nominee title registrant, such as MERS, is notified of the transfer of title to the loan to the conduit bank.

Figure 11:
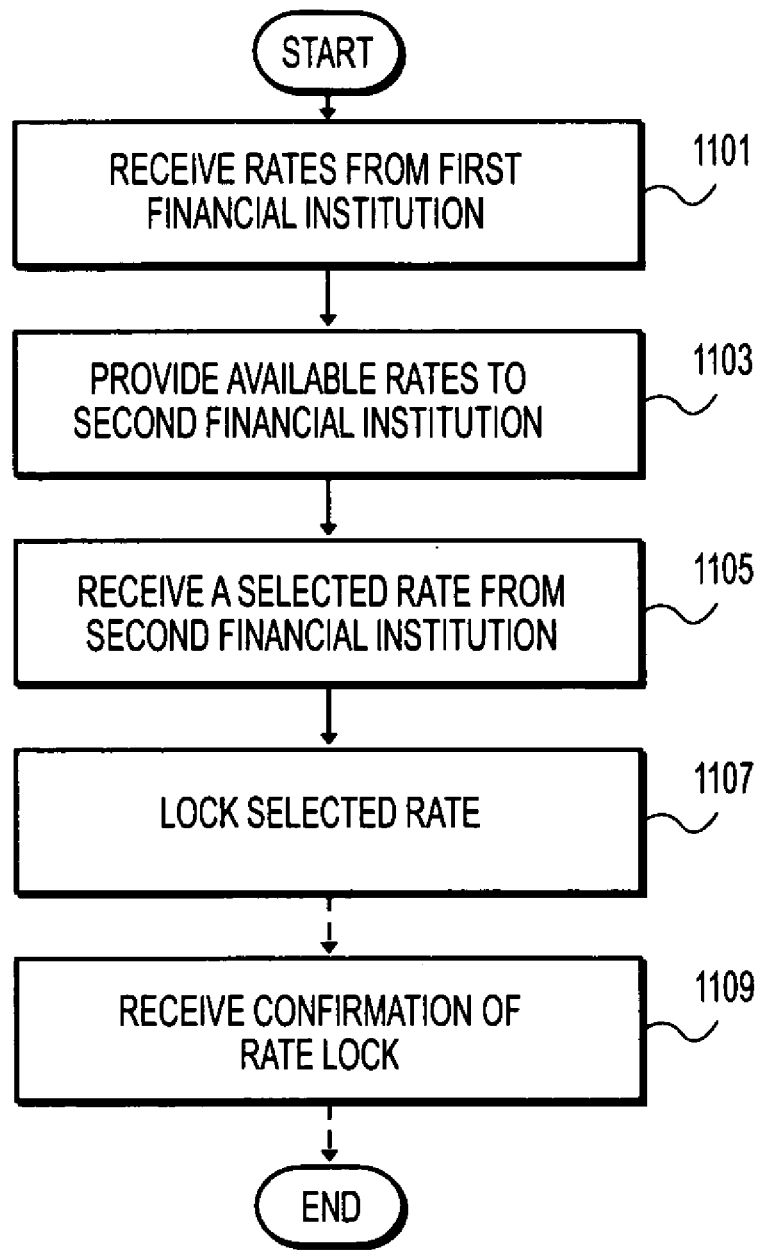
FIG. 11 is a flowchart depicting a second embodiment of a funding process in accordance with the present invention.

FIG. 11 illustrates a flow sale process in accordance with one embodiment of the present invention. At step 1101, the conduit bank provides the interest rates for various loan products to the system 500 on a periodic basis (e.g., hourly, semi-daily, daily, weekly). In a preferred embodiment, these interest rates are uploaded from the conduit bank onto the communication server 501 of system 500. Then at step 1103, the system 500 provides the available interest rates to the mortgage bank. In a preferred embodiment, the mortgage bank is provided with a user identifier and a password. The mortgage bank is then able to log onto system 500 using the identifier and password to access information regarding loan products and corresponding interest rates. In an alternate embodiment, once a mortgage bank registers with system 500, the system 500 automatically provides this information to the mortgage bank periodically.

The mortgage bank/lender can provide a borrower with the available rates for a particular loan product. The borrower can then lock the interest rate by contacting the mortgage bank, such as via the Internet or by contacting a customer service representative. Once the mortgage bank receives the rate lock from the borrower, the system 500 receives the interest rate lock from the mortgage bank at step 1105 and issues the selected rate lock to the conduit bank at step 1107.

In an alternate embodiment the flow sale process includes an additional step 1109 at which the system 500 requests confirmation of the rate lock from conduit bank, and step 1111 at which system 500 receives the confirmation of the rate lock from the conduit bank.

Figure 12:
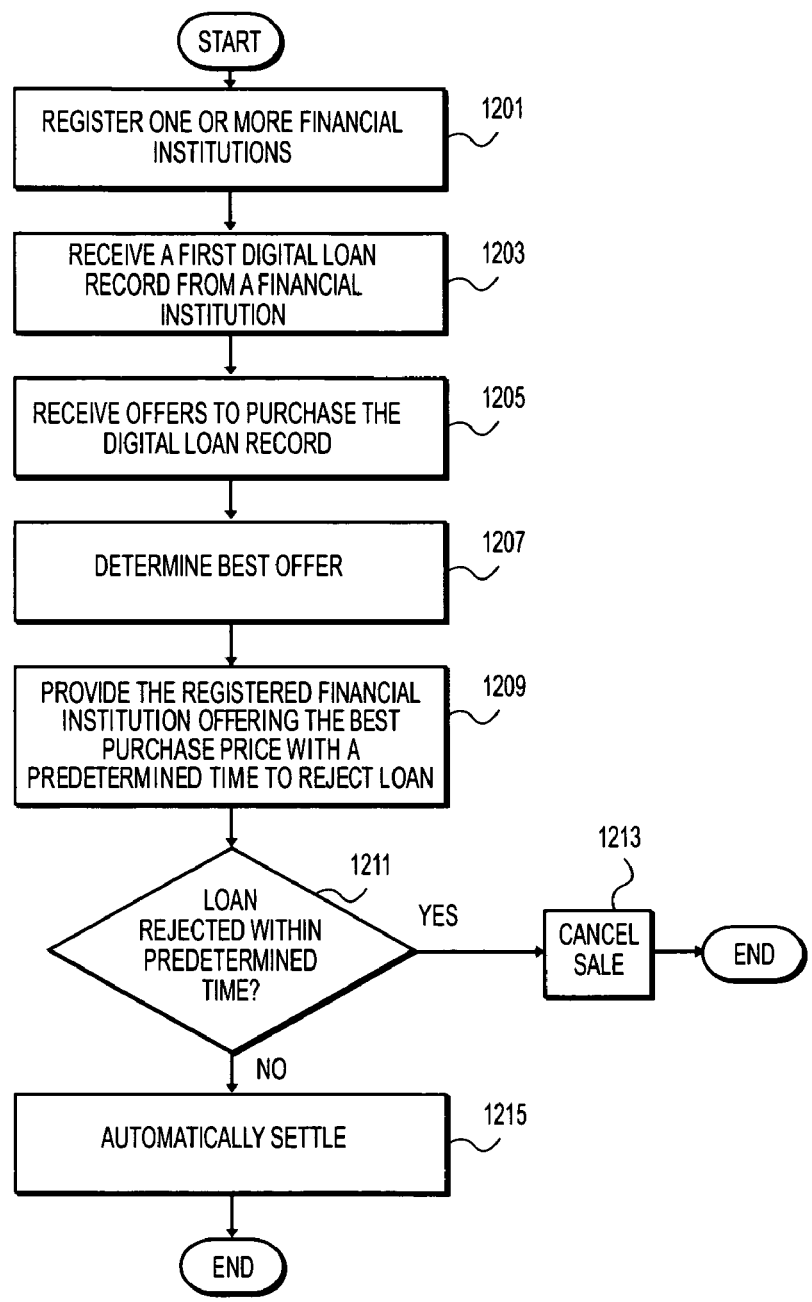
FIG. 12 is a flowchart depicting a third embodiment of a funding process in accordance with the present invention.

FIG. 12 illustrates a bulk sale process in accordance with one embodiment of the present invention. Instead of manually shopping for conduit banks that may be interested in purchasing a loan as in the conventional bulk sale process, in the bulk sale process of the present invention the mortgage bank designates a digital loan record and places it on the market place with an asking price. It will be appreciated by one of ordinary skill in the art that the asking price may be based on any number of factors, and may be issued in dollar terms or percentage terms. For example, in one embodiment the asking price is based on the last sold price of similar products shown by the market place and the prevailing interest rate.

At step 1201 of FIG. 12, one or more conduit banks register with the system 500. A conduit bank is registered after it has proven it has sufficient capital and secured warehouse line of credit, a large letter of credit, or other security to ensure the conduit bank will pay for any loan product. Once these requirements have been met, the system 500 registers the conduit bank as a potential investor.

The system 500 maintains a database of registered conduit banks interested in being given an opportunity to bid on digital loan records. In one embodiment, when a conduit bank registers with the system 500, the conduit bank may specify its preferred type of loan, such as, a 30 year fixed mortgage. In another embodiment, upon logging onto the system 500, a conduit bank may specify a particular profile of a loan indicating what type of loan the bank is interested in at that particular time.

At step 1203, the system 500 receives a digital loan record from a mortgage bank. In a preferred embodiment, the system 500 includes in lender database 640 a list of those registered mortgage banks interested in selling digital loan records under the bulk sale process. However, it will be appreciated that the mortgage banks need not be the user of the automated fulfillment system 501 to participate in the bulk sale process. Mortgage banks who are not registered with system 500 or who have other digital loan records may still participate in the bulk sale process. The system 500 may even conduct the automated settlement process, provided the digital loan record complies with the digital loan record format, such as data structure and the level of digital certificates, on system 500 platform.

Once the system 500 receives the digital loan record, the system 500 puts the loan on the market place with an asking price, which may be expressed in multiple formats, such as a dollar or a percentage of loan amount. In one embodiment, an inventory of loans is maintained and managed by the system 500. The conduit or purchaser of the loan as well as the seller or mortgage bank, needs to be able to see and sort loans based on key fields, such as, contract number; product code; whether it is a prime or subprime loan; type of loan, such as an adjustable rate mortgage (ARM) or a fixed mortgage; origination date of the loan; address of the property; credit score (e.g., FICO score provided by Fair, Isaac and Co.); interest rate for the loan; loan amount; whether the property is owner occupancy; document levels, such as full, alternative or none (which represents the amount of documentation used to complete the loan); secondary financing; loan to value ratio; debt to income ratio; or name of the originating mortgage bank.

In an exemplary embodiment, the mortgage bank, also needs to be able to see and sort other information such as, margin if the loan is an ARM; a weighted average coupon rate; points; name of loan processor; name of underwriter; and name of buyer-conduit. Thus, some or all of this information would also be stored as part of the inventory of loans in loan database 670 on system 500.

In yet another embodiment, the system 500 assigns a fulfillment grade to the loan. This assignment is similar to the assignment discussed above with reference to step 1007 of FIG. 10.

Then at step 1205, the system receives one or more offers from conduit banks to purchase the loan. In a preferred embodiment of the present invention the transaction access rights to the loan are offered for sale, and the conduit banks submit offers to purchase these transaction access rights to the loan. The system 500 evaluates the offers at step 1207 to determine which is the best offer. For example, the best offer may be the first offer received, the highest purchase price offered, the offer price closest to the asking price, the highest offer price greater than the asking price, the first offer price greater than the asking price, or the offer price closest to the sold price of similar loan products.

The system 500 is able to keep track of the sale prices of other loan products with the loan database 670 illustrated in FIG. 9. Based on the status of each loan maintained in status field 902 and the loan amount maintained in loan amount field 927 of loan database 670, the system 500 is able to determine when each of the loans were funded and for what amount.

When the system 500 determines the best offer, at step 1209, the system 500 provides the registered conduit bank offering the best offer with a predetermined time, such as several days, to reject the loan. If the system 500 determines that the loan is rejected within the predetermined time at step 1211, then the sale of the loan to the particular conduit bank is cancelled at step 1213 and the mortgage bank has the option of reissuing the loan to the market place. However, if it is determined that the conduit bank has not rejected or has accepted the loan within the predetermined time, then the process automatically proceeds to settlement at step 1215. System 500 notifies the conduit bank's settlement bank of the purchase of the digital loan record, and sends wire instructions for the principal amount and fees to the warehouse/settlement bank for the mortgage bank. In addition, system 500 also notifies the servicing company, and a nominee title registrant, such as MERS, of the transfer of title to the loan to the conduit bank.

Once sold, the transaction access rights are transferred from the mortgage bank to the conduit bank purchasing the digital loan record. This transfer of access rights is similar to that discussed above with reference to step 1011 of FIG. 10.

Figure 13:
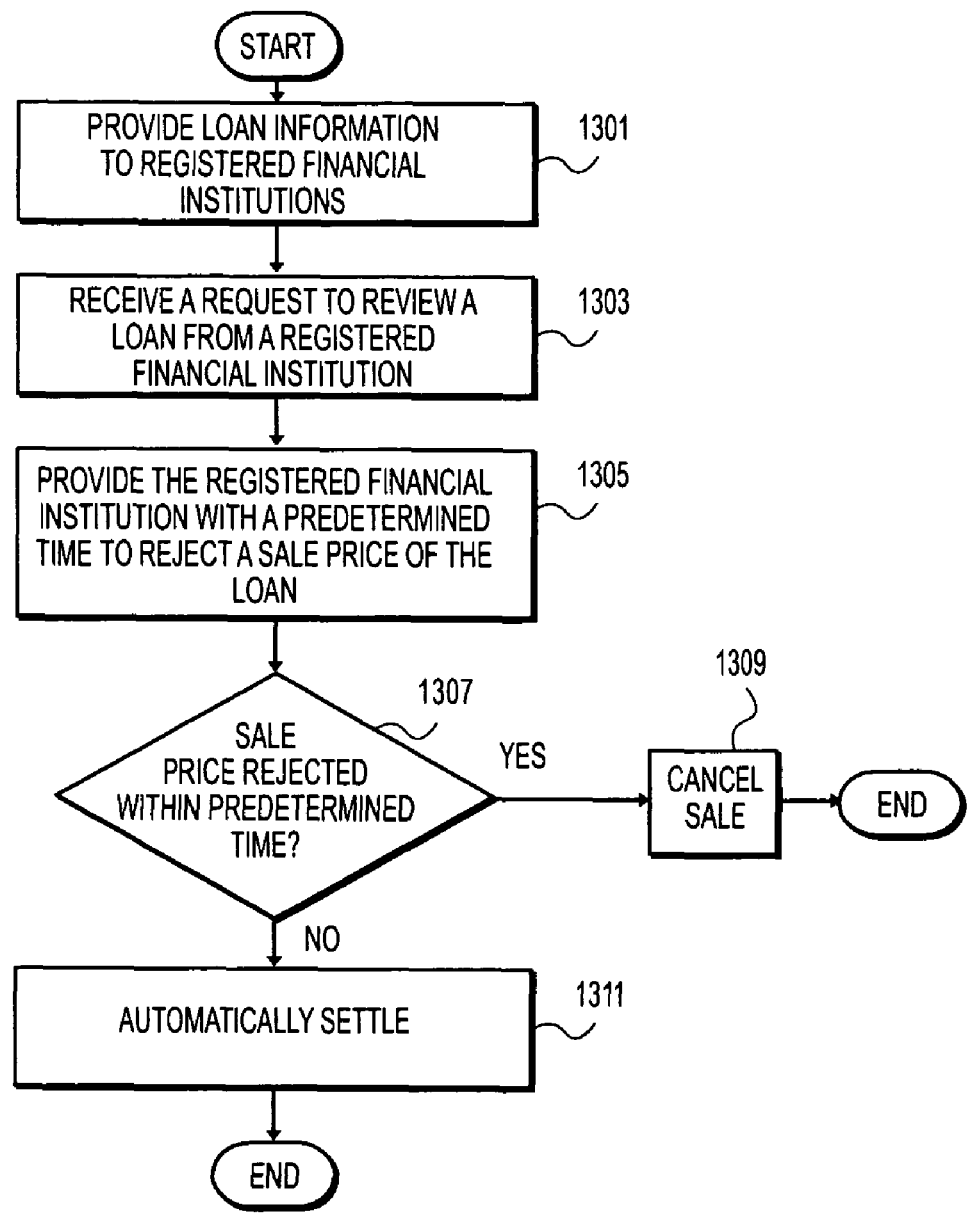
FIG. 13 is a flowchart depicting an automatic settlement process in accordance with the present invention.

FIG. 13 illustrates a flow diagram for automatically settling loans in accordance with an embodiment of the present invention. At step 1301, the system 500 provides loan information to one or more registered financial institutions, such as conduit banks. At step 1303, the system 500 receives a request from one of the registered conduit banks to review a loan. The system 500 enables the requesting conduit bank to review the loan and provides a predetermined time in which the requesting conduit bank may accept or reject the loan, at step 1305.

At step 1307, the system 500 determines whether the loan has been rejected or accepted within the predetermined time. If rejected, then the sale of the loan is cancelled at step 1309 and the process ends. However, if the loan has been either accepted or not rejected within the predetermined time, then the process proceeds to step 1311 for automatic settlement.

Figure 14:
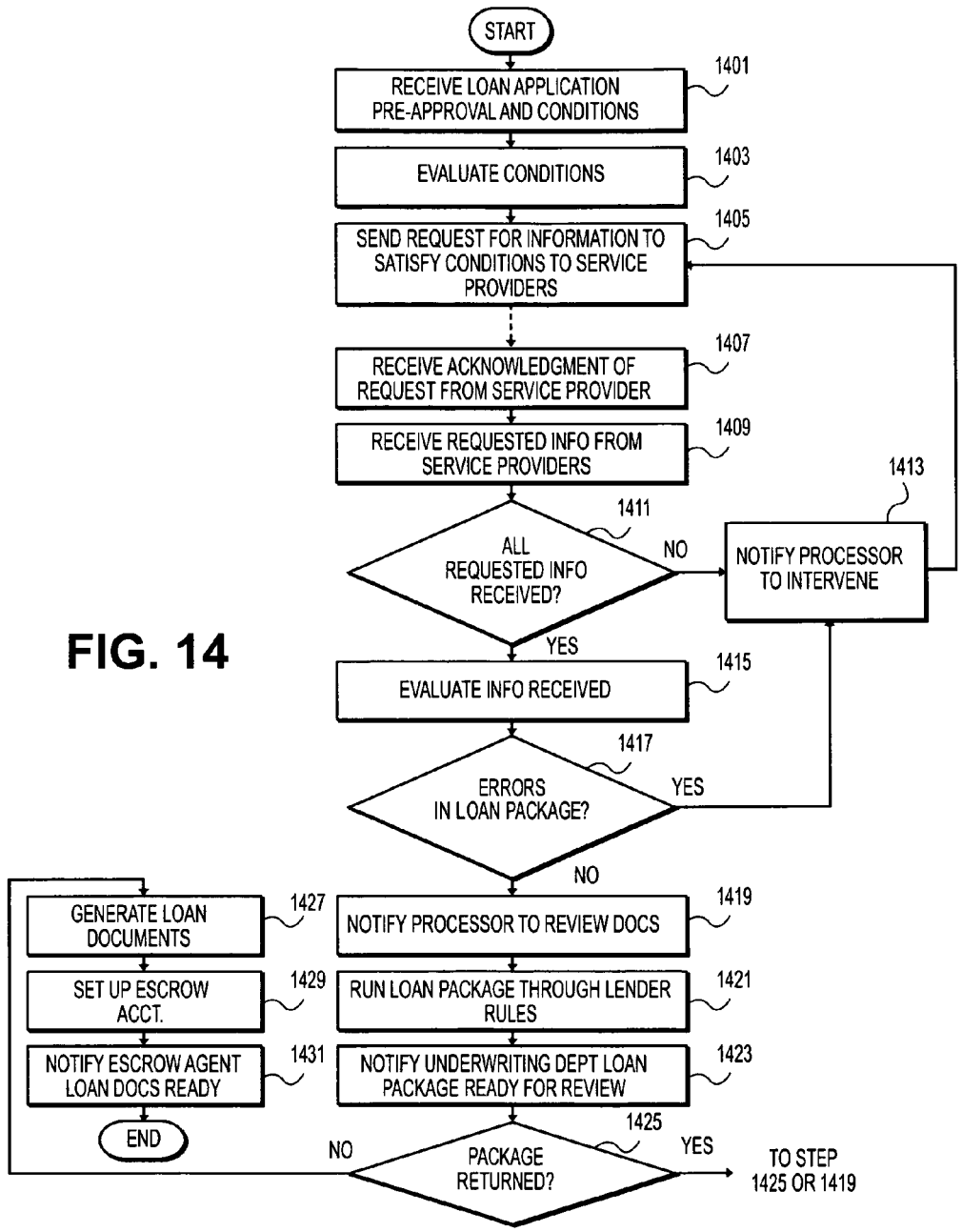
FIG. 14 is a flowchart depicting a lending process in accordance with the present invention.

FIG. 14 illustrates a lending process in accordance with an embodiment of the present invention. The lending process begins similar to the conventional process as set forth in steps 101, 103 and 105 in FIG. 1A. By step 1401, the loan has already been pre-approved by a secondary market buyer with a list of conditions that need to be satisfied for the loan to be funded. For example, the list of conditions may include: verify applicant's bank account information, verify applicant's employment history, and verify applicant's income tax, to ensure such information complies with the corresponding information provided by applicant on the loan application. The list of conditions may be provided to communication server 501 by the human underwriter or an automated pre-approval system. In one embodiment, the conditions are provided to communication server 501 in code form, such as Desktop Underwriting codes used by Fannie Mae. These codes are then uploaded to communications server 501. Thus, at step 1401, communication server 501 receives the loan application, pre-approval, and list of conditions sent by the lender's lender device 502-503, such as the lender's server.

At step 1403, communication server 501 evaluates the conditions, such as the codes, received to determine what actions need to be taken to satisfy the conditions. Based on this determination, communication server 501 sends requests for information to satisfy the conditions to the appropriate entities at step 1405. In particular, at step 1405, communication server 501 automatically requests borrower-specific and property-specific information, such as verification of employment, verification of funds, verification of deposits, verification of income tax information, an appraisal, and a preliminary title report, from service providers.

In one embodiment, communication server 501 uses look-up database 680 to assist in the performance of steps 1403 and 1405. Look-up database 680 maintains data about conditions and corresponding actions to be taken to fulfill the conditions and is explained in more detail with reference to FIG. 15. One of ordinary skill in the art would recognize that the database records illustrated in FIG. 15 are for illustrative purposes only, and that the databases 680 could contain any number of records. An exemplary record from the look-up database 680, is illustrated in FIG. 15. As shown, look-up database 680 maintains data with fields such as a code field 681, a condition field 682, and an action field 683.

Referring now to the code field 681, this field stores an identifier or code for each condition. Each identifier has a corresponding condition stored in condition field 682. For example, in the exemplary look-up database 680 illustrated in FIG. 15, the identifier or code ABC123 corresponds to the verify employment condition, the code 456DEF corresponds to the verify bank account information condition, and the identifier 13579 corresponds to the verify income tax condition.

Action field 683 stores the actions needed to be taken to satisfy the corresponding condition in condition field 682. There may be more than one action associated with the corresponding condition. For example, the actions needed to be taken to satisfy the verify employment condition are for communication server 501 to determine from the loan application whether the applicant is an employee of a company or is self-employed. If the applicant is self-employed, communication server 501 notifies a human processor to send a request for verification from applicant's employer at step 1405. On the other hand, if the applicant is an employee of a company, communication server 501 will send a request for verification of employment to a preferred employment service provider at step 1405. If the preferred service provider does not have the information, then communication server 501 will notify a human processor to directly contact the employer for verification.

Communication server 501 refers to the preferred service provider field of lender database 640 to determine the lender's preferred employment service provider. If a preferred employment service provider is indicated in lender database 640, communication server 501 sends the request for verification of employment information to this service provider. If the lender has not specified a preferred employment service provider, communication server 501 sends the request for verification of employment information to a default service employment provider.

Exemplary look-up database 680 also illustrates that the corresponding action for the verify bank account information condition, having identifier is 456DEF, is for communication server 501 to determine if the applicant's bank identified on the loan application is a registered service provider. Service providers may be registered prior to the lending/application process. In an exemplary embodiment, when service providers are registered they agree to accept electronic requests for property-specific or borrower-specific information and to automatically provide the requested information electronically to communication server 501 in response to the request. If a service provider is not registered, then communication server 501 is unable to automatically contact the service provider and instead must notify a loan processor to contact the service provider to obtain the requested information.

As indicated above, with reference to FIG. 8, the information regarding the registered service providers is maintained in service provider database 660. Communication server 501 checks the service field 801 of service provider database 660, to identify the service for which information is sought and then reviews the list of service providers identified in the corresponding service provider name field 802 and registration field 805 to determine whether the service provider identified in applicant's loan application is a registered service provider. For example, assume the applicant's depository bank identified on the loan application was ABC Bank. Communication server 501 checks service field 661 for the bank service and then determines whether ABC Bank is listed as a registered service provider. Since ABC Bank is listed as a registered service provider, communication server 501 sends a request to ABC Bank electronically for bank account verification information at step 1405. If the applicant had identified a bank that was not listed as a registered service provider, then at step 1405 communication server 501 notifies a processor to contact the bank to obtain the verification of bank account information.

Other conditions and corresponding actions may be included in look-up database 680. For example, the verify income tax information condition has a corresponding action of contacting the IRS to obtain the income tax verification. Thus, at step 1405, communication server 501 contacts the IRS if the IRS is a registered service provider, or notifies a processor to contact the IRS if the IRS is not a registered service provider. Other conditions that may be included in look-up database 680 are obtain appraisal and obtain preliminary title report. Again, communication server 501 checks lender database 640 to determine whether the lender has identified preferred appraisers and preferred title report providers. If these preferred service providers are identified in lender database 640, then communication server 501 sends the request for information to the preferred service provider. If no preferred appraisers or title report service providers are identified, communication server 501 selects a default appraiser or title report service provider and sends the request for information to that entity at step 1405. These default service providers have already been registered with system 500.

In general, communication server 501 looks first to the preferred service provider field of lender database 640 to determine if the lender has identified a preferred service provider for a particular service, such as an appraiser. If no preferred service provider is identified, then communication server looks to the default service provider stored in service provider database 660. Thus, in an exemplary embodiment, addition to automatically sending electronic requests to service providers for information, communication server 501 also provides a loan processor with a list of non-automated tasks that need manual actions. For example, if communication server 501 determines from the applicant's loan application that the down payment is coming from a parental gift, communication server 501 sends a notification to the loan processor to send a request to the applicant's parents for a gift letter. If there is no default service provider for a particular service, then communication server 501 notifies a loan processor to take over the step of requesting information from a service provider at step 1405.

In one embodiment, at step 1407, communication server 501 receives from one or more service providers an acknowledgement of the request for information and an estimated time in which the requested information will be provided. Communication server 501 may provide this information to the loan processor. This estimated time begins a timing process whereby the processor is notified if the requested information is not received within a predetermined time period to that the processor may follow up with the respective service provider.

At step 1409, communication server 501 receives the requested information from the service providers. The system 500 can accept server-to-server communications, such as between service provider device 507 and communication server 501. With such communication, service providers can electronically send reports to communication server 501 with verification information. However, system 500 can also accept other types of communication. In one embodiment communication server 501 provides service providers, such as those not registered with the system 500, with a website address, user name, and password. Using this information, the service provider can access system 500 via the Internet and provide the requested information, for example by the service provider manually inputting the data or uploading the data onto server 501. Thus, the requested information can be input to system 500 electronically or manually.

At step 1411, the system 500 determines whether the information requested from the service providers has been received. If information is not received by a predetermined time, based on the estimated time provided by the service providers at step 1407, a notification is sent at step 1413 to a loan processor to intervene. For example, if the employment service provider indicated that the employment verification information would be provided by 12:00 p.m., and it is now 2:00 p.m., a loan processor is notified to contact the employment service provider to find out when the information will be sent. Thus, the process returns to step 1405 where information is requested from the service providers. If information has been received by the predetermined time, no intervention is necessary, and the process proceeds to step 1415.

At step 1415, communication server 501 evaluates the data on the reports provided by the service providers. In particular, communication server 501 compares the information on the reports with the information provided by the applicant on the loan application. For example, communication server 501 compares the employer, title, and annual salary information obtained from the employment verification report from the employment service provider with that information provided by the applicant on the loan application. Communication server 501 also evaluates the bank name, type of bank account, account balance for the past three months, and account number on the report from the bank to ensure the information matches the corresponding information on applicant's loan application. Communication server 501 also evaluates the appraisal to ensure the property appraised is the same as the property being purchased.

If any errors are found, at step 1417, the loan processor is notified and prompted to contact the original source of the information to obtain the correct information. For example, if there is a discrepancy in the applicant's employment title or bank account number, the loan processor may contact either the applicant or the service provider that provided the information for clarification. If the loan package is complete with no errors, at step 1419 the loan processor is notified to review the loan documents for approval. The loan processor then reviews the loan package for qualitative information (such as an explanation of certain delinquent payments on the credit report).

In one embodiment of the present invention, communication server 501 also hosts a lender's underwriting rules. These are the rules and guidelines stored in field 713 of lender database 640. In such embodiment, the process may include a step 1421 at which communication server 501 runs the loan package through the underwriting rules for a preliminary check. For example, referring to the exemplary lender database 640 illustrated in FIG. 7, ABC Lending Co.'s underwriting rules include a rule that requires communication server 501 to request an applicant's employment information from a prior employer if the applicant has only been at the current place of employment for one year or less or if the applicant has had more than two jobs within the past five years. These underwriting rules may be provided by the lender when the lender registers with the system 500 or may be added later, and are input to communication server 501. However, it will be appreciated by one of ordinary skill in the art that a lender may decline to provide the underwriting rules and guidelines.

Regardless of whether the lender's underwriting rules are hosted on communication server 501, communication server 501 notifies the underwriting department at step 1423 that the loan package is ready for review and final approval. The underwriting department then reviews the loan packages to determine whether all the underwriting criteria are met. If there are any discrepancies, the loan package is returned and sent to the loan processor at step 1425 to resolve any errors, or it can be re-underwritten through automated pre-approval at step 1419 to determine if additional underwriting conditions need to be satisfied. This can happen, for example, if the borrower stated that the property is a single family unit, when it fact it is a flat in a two story building.

If all the underwriting criteria are met, then at step 1427, the loan documents are generated on communication server 501 platform using the information on communication server 501. Communication server 501 hosts each lender's loan documents and inserts the information obtained from the previous steps in the process into these documents to generate the loan the documents. At step 1429, the system 500 sets up an escrow account at the title company and at step 1431 an escrow agent is notified, such as via electronic mail ("e-mail"), of the availability of the loan documents. The borrower is then notified that the documents are ready for review and signature.

Figure 16:
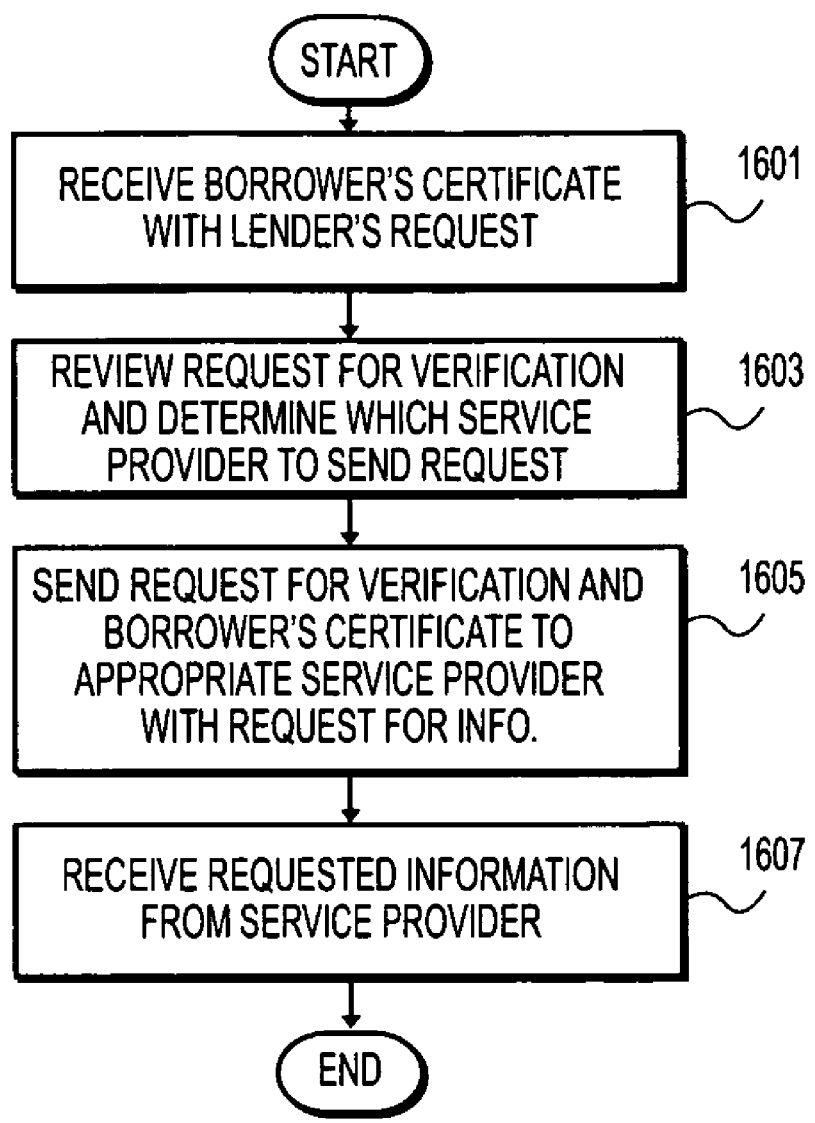
FIG. 16 is a flowchart depicting authorization of a borrower's signature in accordance with a first embodiment of the present invention.

In one embodiment of the present invention the system 500 uses a borrower's electronic signature rather than manual signature (also known as wet ink) for authorization purposes. Operation of this embodiment is illustrated in FIG. 16. As part of the borrower's application process, a certificate authority, such as DST, issues a digital certificate to the borrower. In one embodiment, the certificate is both roaming and expiring, however, it will be appreciated that the digital certificate need not be roaming or expiring. The roaming feature is to provide convenience to the borrower. Normally, a digital certificate is tied to a specific device, such as a personal computer. Thus, it would be impossible to issue the borrower a certificate that can be used other than at home. By using a roaming certificate, the borrower can attach the certificate to any document, e.g., at the title office. In such embodiment, the certificate authority issues the digital certificate to communication server 501 which stores it on the system 500.

The expiration feature is to prevent what is known as password degradation. If the password remains the same on the certificate, other people may be able to figure out what that password is and start using it. This is identity theft. By using an expiring certificate, the certificate authority will automatically fail a certification after a certain period of time.

Figure 17:
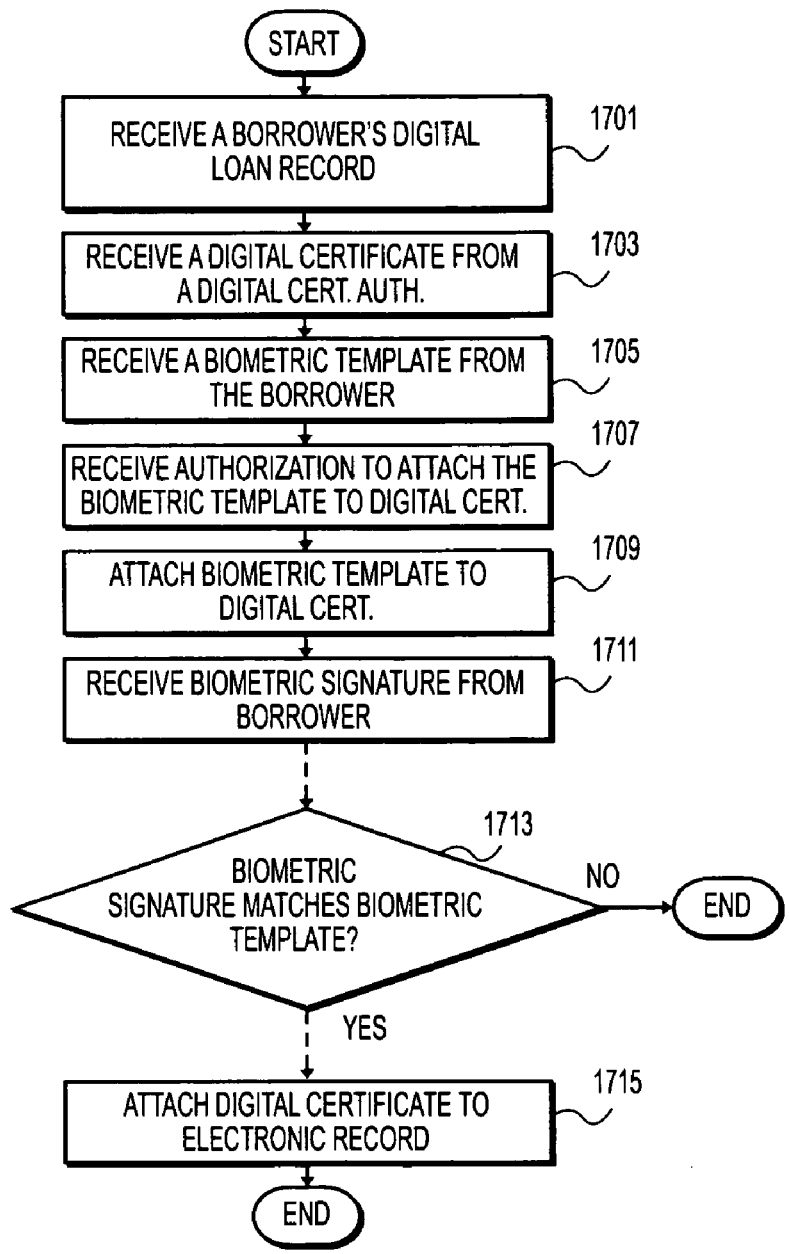
FIG. 17 is a flowchart depicting authorization of a borrower's signature in accordance with a second embodiment of the present invention.

Another way to combat the security problem is to combine a biometric "signature" with a digital certificate. Such embodiment is discussed more fully with reference to FIG. 17. At step 1701, communication server 501 receives a borrower's digital loan record, for example from a lender. In addition to receiving the borrower's digital certificate from a digital certificate authority at step 1703, communication server 501 receives a template of the borrower's biometric (e.g., a pupil scan, a thumb print scan, or a handwritten signature capture via an electronic pad) at step 1705 which it stores at the beginning of the loan process. At step 1707, the borrower authorizes communication server 501 to attach the biometric template to the digital certificate, which communication server does at step 1709.

A preferred embodiment of the present invention further includes steps 1711, 1713, and 1715. At step 1711, communication server 501 receives the borrower's biometric signature. At the time of signing the loan document, the digital certificate is attached to the digital loan record at step 1715, encrypting the record, but released only when a matching biometric is input by the borrower and matched with the borrower's template at step 1713. This may be used in lieu of passwords (which the borrower may have forgotten by the time it gets to the document signing state).

When the borrower authorizes a lender to conduct a verification by attaching his personal digital certificate which is an expiring certificate, the authorization is valid for a particular time, such as two weeks. If the verification is not conducted within that time, the authorization expires. For example, the borrower may authorize the lender to obtain verification of the borrower's funds from the borrower's depository bank. The borrower's digital certificate is included as part of the borrower's authorization and may only be valid for one week. If the lender fails to conduct the verification within the one week period, the digital certificate expires and the authorization to obtain the verification information is cancelled. By using the digital certificate, the lender (as well as any other service provider) can check the authenticity of the borrower's digital certificate with the certifying authority, such as DST. This ensures the person giving the authorization is a person entitled to do so.

The lender requests verification of information through the communication server 501 platform. Referring again to FIG. 16, at step 1601, communication server 501 receives the borrower's digital certificate with the authorization. At step 1605, communication server 501 reviews the request for verification information and determines which service provider 506, 507 to contact in order to obtain the requested information. This determination is based on look-up database 680 discussed above with reference to FIGS. 12 and 13. Although this process is automatic, it can be manually overridden. Each lender may have its own preferred service providers as indicated in service provider field of lender provider database 640. These providers will be the first chosen for a specific verification. However, the lender can choose another service provider as long as the service provider is registered with the system 500. For example, the seller may indicate that it prefers to use First American Title rather than Old Republic Title as its title company. If a lender wants a service provider who is not on system 500, that provider has to be integrated on the system 500 before information can be automatically sent to it. Otherwise, the service provider will have to submit the information through other means.

At step 1605, communication server 501 sends the request for verification of information and the borrower's digital certificate to the service provider 506, 507, which in the case of the above example would be the borrower's depository bank. The service provider 506, 507 is able to verify the authenticity of the borrower's digital certificate with the certifying authority, for example DST. If the certificate is authentic, then the information provider provides the requested information to the communication server 501 at step 1607, which then provides the information to the lender.

In an alternate embodiment of the present invention, the authorization expires as the digital certificate and authorization are passed in the process. For example, after the lender verifies the authenticity of the borrower's digital certificate, and the lender passes the authorization to the communication server 501, the borrower's authorization expires at the time the information from the service provider is returned. Thus, the lender is unable to resubmit the borrower's authorization at some later date to obtain a second verification. This for example, is important for tax information because the tax authorities are concerned with privacy. In addition, the same digital certificate can be used for the signing of the final loan documents.

In one embodiment, data integrity of the information provided by service providers is maintained by using encryption technologies such as server level digital certificates. If a service provider provides information through their own server device 507, the digital certificate accompanying the information identifies such information to communication server 501 as being sourced from that service provider alone. The security of the communication server 501 platform prevents modification of source data. For example, if the title report was obtained from Old Republic Title, any change made by anyone other than Old Republic Title, whether in format or content, triggers a certificate violation alert, thus invalidating the integrity. Only Old Republic Title can append or amend the report with a new encryption.

In yet another alternate embodiment, server certificates are used for communication between servers. In such embodiment, when the lender requests verification of borrower information through the communication server 501, the lender's server certificate is also provided to communication server 501. This enables communication server 501 to verify the authenticity of the lender who is requesting the borrower information. Similarly, when the communication server 501 receives the requested borrower information from a service provider 506, 507, communication server 501 also receives a server certificate of the service provider 506, 507.

By utilizing digital certificates, lenders, service providers, and other intermediaries are unable to manipulate data in the loan documents or other related documents, such as an appraisal. In addition, by utilizing expiring digital certificates, lenders, service providers and other intermediaries are unable to resubmit loan documents or other verification requests on subsequent dates, multiple times, or without the borrower's knowledge or consent.

The present invention allows the conduit bank to underwrite loans directly, sometimes known as point-of-sale or direct-to-consumer. The mortgage banker is transformed into a customer service front end and will no longer underwrite the loans. There is no need to have a two-step process where the mortgage banker underwrites a loan and then sells it to the conduit bank. The mortgage banker collects its fees for customer services (pre and post funding), and lead generation, but does not bear the interest rate risks or collect an interest rate spread which is the difference between what the mortgage banker collects and what it pays to the conduit bank.

The direct-to-consumer route is important to conduit investors because they make their profits from selling mortgage backed securities ("MBS") to the general public. Their income comes primarily from collecting the spread, which is the difference between what the conduit investors collect in interest income and what they pay the MBS holders as dividends. A direct-to-consumer route allows the conduit investors to keep more of the interest rate spread by avoiding paying the middle person, namely, the mortgage bank.

In yet another embodiment of the present invention, the system 500 maintains a borrower profile. In such embodiment, after the borrower completes a loan, the borrower's information, such as credit score and asset, employment, and income information, is stored on communication server 501 in borrower database 630. The borrower can update this information through an automated system via the system 500's web site, through interactive voice response systems, or through customer service phone line anytime the borrower wants to refinance or obtain a new loan. In such embodiment, the borrower controls how and when the update occurs because the borrower will only request the update and present the updated profile to a preferred lender. The lender cannot alter the profile or request updates without the borrower's authorization.

In operation, when the borrower obtains a loan, the borrower provides an updated borrower profile from system 500, similar to presenting a credit profile, to the lender. The profile contains the information from the previous loan, and the system 500 can add the borrower's payment history. Lenders then run the borrower's profile through their pricing model to determine the appropriate interest rates. This embodiment of the present invention enables the borrower's loan process to be faster and more efficient. Since the borrower's information has already been verified, it only needs to be updated. Thus, time is saved by the borrower not having to fill out another loan application and waiting for the information to be verified. It further reduces misrepresentation risks because the information is not provided by the borrower alone, but from other independent third party sources.

The present invention has many advantages over the conventional lending process. The present invention is provided through a platform that can be directly integrated into each customer's loan origination systems ("LOS") front end or the automated preapproval systems. Thus, customers do not need any additional training. Information requests and deposits with multiple source cross-verifications are automated. This automation reduces the processing costs of each loan, accelerates the revenue generation cycle for brokers and lenders because the loans close faster, and improves the identification of risks thereby reducing associated costs, and enlarging the available pool of funds for further lending. The use of digital certificate authentication provides a higher quality of data. Thus, customers are assured of a high quality report with absolute data integrity, which reduces quality control and auditing costs. Communication server 501 can directly host customer's business rules and guidelines. Thus, customers can use system 500 to increase productivity. The data mining capabilities enable customers to monitor their information providers and process to identify bottlenecks.

It will be apparent to those skilled in the art that various modifications and variations can be made in the present invention and in construction of the invention without departing from the scope or spirit of the invention. Other embodiments of the invention will be apparent to those skilled in the art from consideration of the specification and practice of the invention disclosed herein. The specification and examples should be considered as exemplary only, with the true scope and spirit of the invention indicated by the following claims.

What is claimed is:

1. A method for managing loan products on a server, said method comprising the server performing steps of:
   receiving by a computer processor of the server a commitment contract, the commitment contract specifying a number of loan products to be fulfilled as a group to satisfy said commitment contract;
   automatically managing by said processor one or more underwriting criteria by maintaining in a database a data record of funded loans for said loan products, wherein one of said loan products has a corresponding group of underwriting criteria, and wherein automatically managing comprises automatically evaluating the underwriting criteria, calculating and assigning by said processor a fulfillment grade to a funded loan based on data stored in a database of funded loans for said loan products, and automatically executing actions to fulfill the commitment contract according to the underwriting criteria with the specified number of loan products, wherein the fulfillment grade is based on a reliability score for data obtained during a fulfillment process including a verification by the processor of an electronic certificate associated with a borrower of the funded loan;
   automatically generating by said processor loan documents on the server for said loan products for signature by a borrower when said one or more underwriting criteria are fulfilled; and
   accepting by said processor one or more electronic certificates of the borrower and biometric signatures of the borrower as a signature on the loan documents.

2. The method of claim 1, wherein the step of managing one or more underwriting criteria comprises the steps of: receiving said underwriting criteria from one or more financial institutions; storing said underwriting criteria on said server; and providing to a first financial institution a group of underwriting criteria corresponding to one of said loan products.

3. The method of claim 1, wherein said fulfillment grade is based on a reliability of data obtained during a fulfillment process.

4. The method of claim 1, further comprising:
   storing data by said processor in the data record indicating how many of said number of loan products still need to be fulfilled to satisfy said commitment contract; and
   transmitting over a network to a client computer said indication as data for display in response to a request of the client computer.

5. The method of claim 1, wherein the step of automatically managing one or more underwriting criteria comprises the steps of:
   receiving said underwriting criteria from one or more financial institutions;
   automatically satisfying said underwriting criteria on said server.

6. The method of claim 1, wherein the commitment contract comprises a contract between a secondary market investor and a primary mortgage lender, and wherein the number of loan products comprises at least one quantity of at least one type of unfunded loan product.

7. A method for managing loan products on a server, said method comprising the server performing steps of:
   receiving by a computer processor of the server a commitment contract between a secondary market investor and a primary mortgage bank, the commitment contract specifying a quantity of not yet funded loan products to be fulfilled as a group to satisfy said commitment contract;
   automatically managing by said processor one or more underwriting criteria for said loan products, wherein one of said loan products has a corresponding group of underwriting criteria, and wherein automatically managing comprises
      calculating and assigning by said processor a fulfillment grade to funded loans based on data stored in a database of funded loans for said loan products,
      automatically executing actions to fulfill the commitment contract according to the underwriting criteria with the specified number of loan products,
      identifying one or more loans that have already been funded in the server,
      receiving a request from a first financial institution owning the one or more loans to transfer to a second financial institution rights to the one or more loans as specified by the first financial institution, and
      identifying on the server which financial institution owns which rights to said loan, including the duration of such ownership; and
   accepting by said processor one or more electronic certificates of the borrower and biometric signatures of the borrower as a signature on loan documents automatically generated on the server for said loan products for signature by a borrower when said one or more underwriting criteria are fulfilled.

8. The method of claim 7, wherein the step of automatically managing one or more underwriting criteria comprises the steps of:
- receiving said underwriting criteria from one or more financial institutions;
- automatically satisfying said underwriting criteria on said server.

9. The method of claim 1, wherein receiving by a computer comprises receiving from a client computer over a network, and wherein automatically executing actions comprises the server transmitting data over the network to the client.

10. The method of claim 2, wherein receiving said underwriting criteria comprises receiving from one or more client computers over a network, and wherein providing to a first financial institution comprises providing the group of underwriting criteria by transmitting data over the network for display at a client computer.

11. The method of claim 1, wherein the verification of the electronic certificate by the processor includes verification of the biometric signature.

12. The method of claim 1, wherein verification of the electronic certificate by the processor includes verification of a handwritten signature of the buyer captured by an electronic pad.

13. The method of claim 1, wherein accepting the electronic certificate of the borrower further comprises:
- verifying said electronic certificate by said processor with an issuing certificate authority when verification is required by an underwriting criteria; and
- storing verification data in an appended verification record associated with the borrower.

14. The method of claim 7, wherein accepting the electronic certificate of the borrower further comprises:
- verifying said electronic certificate by said processor with an issuing certificate authority when verification is required by an underwriting criteria; and
- storing verification data in an appended verification record associated with the borrower.

* * * * *